U S011446989B1

(12) United States Patent
Brown et al.

(10) Patent No.: US 11,446,989 B1
(45) Date of Patent: *Sep. 20, 2022

(54) DOORS WITH ADAPTIVE POSITIONING

(71) Applicant: Apple Inc., Cupertino, CA (US)

(72) Inventors: Matthew L. Brown, San Jose, CA (US); Phillip Michael Hobson, Menlo Park, CA (US); John Raff, Menlo Park, CA (US); Sung H. Kim, Palo Alto, CA (US); Russell C. Mead, Jr., Chapel Hill, NC (US); Ronald J. Smith, New Berlin, WI (US)

(73) Assignee: Apple Inc., Cupertino, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 16/543,416

(22) Filed: Aug. 16, 2019

Related U.S. Application Data

(63) Continuation of application No. 15/403,059, filed on Jan. 10, 2017, now Pat. No. 10,384,519.
(Continued)

(51) Int. Cl.
*B60J 5/04* (2006.01)
*B60J 5/06* (2006.01)
(Continued)

(52) U.S. Cl.
CPC ............. *B60J 5/0479* (2013.01); *B60J 5/047* (2013.01); *B60J 5/06* (2013.01); *E05D 15/101* (2013.01); *E05D 15/58* (2013.01); *E05F 15/632* (2015.01); *E06B 3/509* (2013.01); *E05Y 2900/531* (2013.01)

(58) Field of Classification Search
CPC . E05F 15/40; E05F 15/70; E05F 15/00; E05F 15/63; E05F 15/611; E05F 15/622; E05F 15/614; E05F 15/646; E05F 15/632; E05Y 2900/531; B60J 5/047;
(Continued)

(56) References Cited

U.S. PATENT DOCUMENTS 2,589,493 A 3/1952 Henry
4,433,505 A 2/1984 Viner
(Continued)

FOREIGN PATENT DOCUMENTS

EP 0957019 11/1999
WO 2013031553 3/2013

*Primary Examiner* — Justin B Rephann
(74) *Attorney, Agent, or Firm* — Treyz Law Group, P.C.; Kendall P. Woodruff

(57) ABSTRACT

Doors on a vehicle may be controlled by a door positioning system that moves the doors freely and fluidly relative to the body of the vehicle. The doors may include front and rear doors on each side of the vehicle. The door positioning system may control the movement and positioning of each door using a door mechanism coupled between the door and the body of the vehicle. The door positioning system may determine a position or path of motion for each door based on sensor data and user input. The door positioning system may issue corresponding control signals to actuators in the door mechanism to position the door accordingly. For example, the front door may slide open at an angle to accommodate an angled tire. Front and rear doors may open in opposite directions to create a large, unobstructed space for passengers to enter and exit the vehicle.

17 Claims, 15 Drawing Sheets

Related U.S. Application Data

(60) Provisional application No. 62/277,655, filed on Jan. 12, 2016.

(51) Int. Cl.
*E05D 15/10* (2006.01)
*E05D 15/58* (2006.01)
*E06B 3/50* (2006.01)
*E05F 15/632* (2015.01)

(58) Field of Classification Search
CPC ......... B60J 5/0479; B60J 5/06; E05D 15/101; E05D 15/1081; E05D 15/58; E06B 3/509
See application file for complete search history.

(56) References Cited

U.S. PATENT DOCUMENTS

| | | | |
|---|---|---|---|
| 4,544,198 A * | 10/1985 | Ochiai | B60J 5/0479 296/155 |
| 5,507,119 A | 4/1996 | Sumiya et al. | |
| 6,125,583 A | 10/2000 | Murray et al. | |
| 6,183,039 B1 | 2/2001 | Kohut et al. | |
| 6,382,705 B1 | 5/2002 | Lang et al. | |
| 6,840,567 B2 | 1/2005 | Fushimi et al. | |
| 6,860,543 B2 | 3/2005 | George et al. | |
| 6,997,504 B1 * | 2/2006 | Lang | E05D 3/127 16/334 |
| 7,097,229 B1 * | 8/2006 | Chernoff | B60J 5/047 296/146.1 |
| 7,104,588 B2 | 9/2006 | George et al. | |
| 7,243,461 B2 | 7/2007 | Rogers, Jr. et al. | |
| 7,393,044 B2 | 7/2008 | Enomoto | |
| 7,500,711 B1 | 3/2009 | Ewing et al. | |
| 7,611,190 B1 | 11/2009 | Elliott et al. | |
| 7,761,209 B2 | 7/2010 | Morris et al. | |
| 7,819,465 B2 * | 10/2010 | Elliott | B60J 5/0479 296/202 |
| 7,896,425 B2 | 3/2011 | Elliott et al. | |
| 8,096,605 B2 * | 1/2012 | Heuel | B60J 5/06 296/155 |
| 8,096,606 B2 | 1/2012 | Hanaki et al. | |
| 8,162,379 B2 * | 4/2012 | Yano | B60J 5/047 296/146.4 |
| 8,234,817 B2 | 8/2012 | Neundorf et al. | |
| 8,336,949 B2 | 12/2012 | Boettcher | |
| 8,353,555 B2 | 1/2013 | Boettcher | |
| 8,740,284 B2 * | 6/2014 | Freymann | B60J 5/0479 296/146.4 |
| 8,893,436 B2 | 11/2014 | Choi | |
| 9,217,269 B2 | 12/2015 | Lobkovich | |
| 9,440,519 B2 | 9/2016 | Choi | |
| 9,475,368 B2 | 10/2016 | Choi | |
| 9,650,826 B2 | 5/2017 | Potter | |
| 9,777,811 B2 | 10/2017 | Choi et al. | |
| 2005/0039404 A1 | 2/2005 | Mrkovic et al. | |
| 2005/0082871 A1 | 4/2005 | Anders | |
| 2005/0146159 A1 | 7/2005 | Shen et al. | |
| 2005/0270177 A1 | 12/2005 | Mori et al. | |
| 2006/0267375 A1 | 11/2006 | Enomoto | |
| 2008/0018140 A1 | 1/2008 | Reutter et al. | |
| 2008/0100091 A1 | 5/2008 | Kunishima et al. | |
| 2009/0000200 A1 | 1/2009 | Heuel et al. | |
| 2009/0021190 A1 | 1/2009 | Shibata | |
| 2009/0051194 A1 | 2/2009 | Elliott et al. | |
| 2009/0200833 A1 * | 8/2009 | Heuel | B60J 5/06 296/155 |
| 2009/0224879 A1 * | 9/2009 | Nakazawa | G07C 9/00309 340/5.72 |
| 2013/0097940 A1 * | 4/2013 | Brown | E05F 15/605 49/506 |
| 2013/0099523 A1 * | 4/2013 | Brown | B60J 5/0473 296/146.9 |
| 2013/0099524 A1 * | 4/2013 | Brown | E05F 15/605 296/146.9 |
| 2013/0317706 A1 | 11/2013 | Ishibashi et al. | |
| 2015/0059250 A1 | 3/2015 | Miu et al. | |
| 2015/0330134 A1 | 11/2015 | Bendel | |
| 2016/0123060 A1 | 5/2016 | Choi et al. | |
| 2016/0129769 A1 | 5/2016 | Choi | |
| 2016/0297399 A1 | 10/2016 | Suzuki et al. | |
| 2017/0247927 A1 * | 8/2017 | Elie | G01R 31/3646 |
| 2017/0247932 A1 * | 8/2017 | Partsch | E05F 15/70 |

* cited by examiner

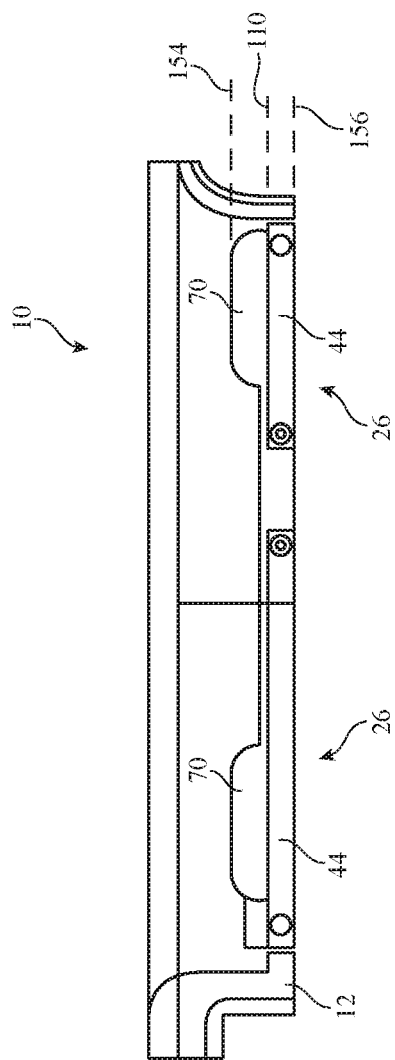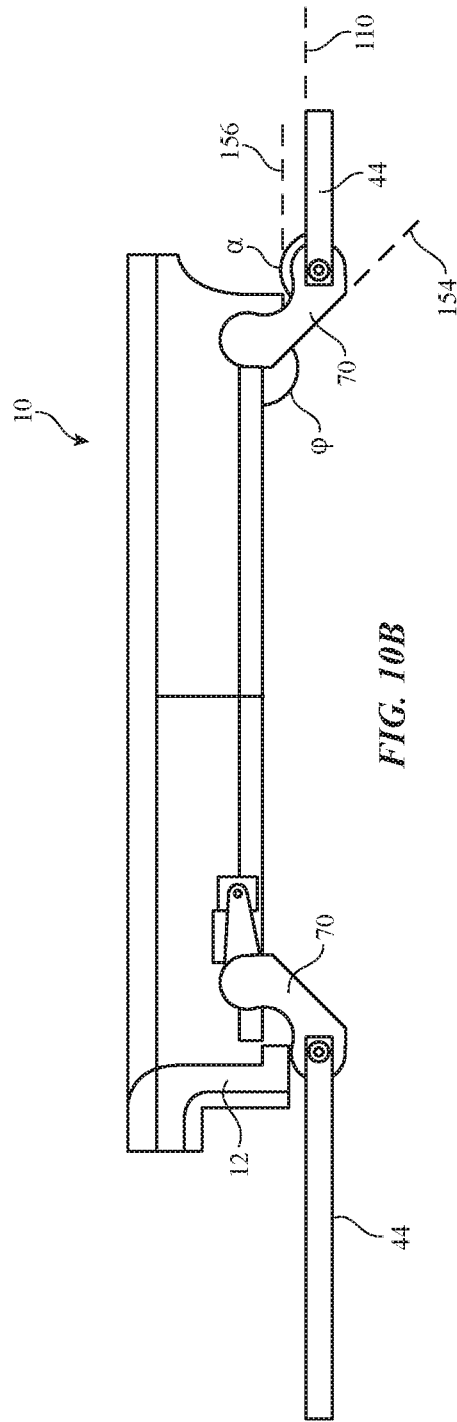
FIG. 10A
FIG. 10B

DOORS WITH ADAPTIVE POSITIONING

This application is a continuation of patent application Ser. No. 15/403,059, filed Jan. 10, 2017, which claims the benefit of provisional patent application No. 62/277,655, filed Jan. 12, 2016, both of which are hereby incorporated by reference herein in their entireties.

BACKGROUND

This relates generally to doors and, more particularly, doors that form part of a vehicle.

Vehicles such as automobiles include doors for allowing passengers to enter and exit. Most vehicles have hinged doors that swing open at an angle to the vehicle. Hinged doors are typically operated manually and can be cumbersome for passengers to open and close. A passenger may also find it difficult to enter and exit the vehicle through a hinged door because the door itself may obstruct the passenger's path out of or into the vehicle.

Some vehicles use sliding doors that slide open along the side of the vehicle, providing an unobstructed path into and out of the vehicle. Sliding doors typically provide larger openings and easier access to the vehicle and are sometimes powered so that the doors can be opened and closed automatically.

Conventional sliding doors are restricted to move along a single path from a closed position to an open position. Since the sliding doors are bound by the three guide rails, the open position relative to the vehicle does not change and the path to the open position does not change. The inability to adjust the path of motion for a sliding door places undesirable limitations on the placement of sliding doors on vehicles and the types of vehicles with which sliding doors are compatible. For example, the inability to adjust the position of an open sliding door relative to the side of a vehicle prevents typical sliding doors from being used for front seats since the front tires may sometimes obstruct the door's path of motion.

SUMMARY

A vehicle may have doors. The doors may include front and rear doors on each side of the vehicle. The doors may open and close by moving along the side of the vehicle. For example, the front doors may open by moving towards the front of the vehicle and the rear doors may open by moving towards the rear of the vehicle. When both front and rear doors are open on one side of the vehicle, an unobstructed opening on the side of the vehicle may allow passengers to easily enter and exit the vehicle.

One or more latches may be used to secure a front door on the side of the vehicle to a rear door on the side of the vehicle, thereby eliminating the need for a pillar or column between the front seat and the back seat of the vehicle. This provides a large area for entry and exit and frees up additional space within the vehicle (e.g., for legroom, storage, gaming consoles, etc.).

The movement and positioning of each door may be controlled and adjusted dynamically by a door mechanism coupled between the door and the body of the vehicle. The door mechanism may be controlled by a door controller that receives sensor data from sensors in the vehicle. The door controller may determine how to move and position the door based on the sensor data and may issue corresponding control signals to actuators in the door mechanism to move and position the door accordingly. For example, the sensor data may include steering angle information that indicates an angle of a front tire and the front door may open at an angle relative to the side of the vehicle to accommodate the angled tire.

The door mechanism may include an arm that extends between the body and the door. The arm may rotate relative to the vehicle body about a first axis and the door may rotate relative to the arm about a second axis. The arm member may be coupled to a sliding member that slides within the door along a third axis. If desired, the door mechanism may be the only support member that attaches the door to the body of the vehicle. The door mechanism may be attached to a lower portion of the body or may be attached to any other suitable location on the body.

The door mechanism may include actuators for controlling the movement of various components in the door mechanism. For example, a first actuator may control the rotation of the arm relative to body about the first axis, a second actuator may control the rotation of the door relative to the arm about the second axis, and a third actuator may control the linear motion of the sliding member along the third axis. The first and second axes may be parallel to one another and the third axis may be non-parallel to the first and second axes. The third axis of motion may, for example, be orthogonal to the first and second axes.

The arm may have first and second openings. A first shaft member in the first opening may be attached to the body of the vehicle. A second shaft member in the second opening may be attached to the sliding member on the door. The first axis of rotation may be aligned with the longitudinal axis of the first shaft member and the second axis of rotation may be aligned with the longitudinal axis of the second shaft member.

Further features will be more apparent from the accompanying drawings and the following detailed description.

BRIEF DESCRIPTION OF THE DRAWINGS

FIGS. 10A and 10B show top views of adaptively positioned doors in closed and open positions, respectively, in accordance with an embodiment.

DETAILED DESCRIPTION

Vehicles such as automobiles may include doors. As an example, a vehicle may have left and right front doors for allowing passengers in the front of the vehicle to enter and exit and left and right rear doors for allowing passengers in the rear of the vehicle to enter and exit. The doors may be independently controlled by an adaptive door positioning system. Rather than opening and closing in a fixed, non-adjustable manner, the doors may be adaptively positioned. The doors may, for example, be adaptively positioned based on sensor data or user input. Providing vehicle doors with adaptive positioning allows the doors to be opened and closed in a manner that can be adjusted based on the vehicle's surroundings. For example, doors may be adaptively positioned to avoid colliding with obstructions (e.g., nearby vehicles), to provide easier access to the vehicle when a passenger approaches from a given direction, to facilitate exiting the vehicle in tight parking spaces, to accommodate angled tires, to accommodate inclined surfaces, etc.

The door positioning system may include control circuitry that issues control signals to a door mechanism associated with each door. The control signals may be based on sensor data, user input, or other input received by the door positioning system. In response to the control signals, the door mechanism may be configured to move the door along a prescribed path and/or position the door in a desired location relative to the body of the vehicle. The door mechanism may have one or more rotational axes and/or one or more linear axes that allow the door to rotate, slide, hinge, or otherwise move freely relative to the side of the vehicle.

Figure 1:
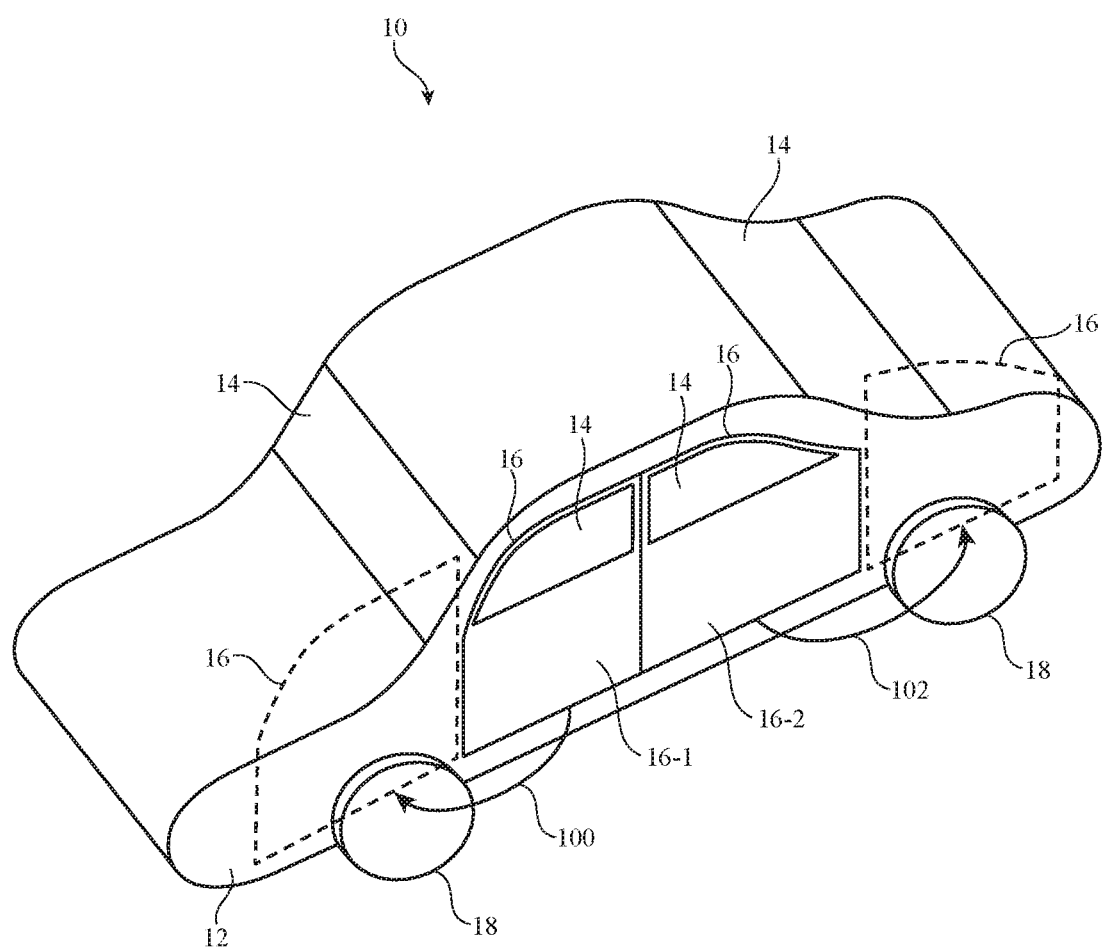
FIG. 1 is a perspective view of an illustrative vehicle with adaptively positioned doors in a closed position in accordance with an embodiment.

A perspective view of an illustrative vehicle of the type that may be provided with adaptively positioned doors is shown in FIG. 1. Vehicle 10 may be a self-powered motor vehicle for transporting passengers. Vehicle 10 may be powered by an internal combustion engine (e.g., using gasoline or diesel fuel), may be powered by alternative fuels (e.g., ethanol, natural gas, etc.), or may be powered by electricity. In some configurations, vehicle 10 may be a "hybrid" vehicle that uses any two or more of these types of power.

Vehicle 10 may be an autonomous vehicle that drives itself (sometimes referred to as a "driverless" car), a semi-autonomous vehicle that is operated by a driver while handling some functions automatically, or a non-autonomous vehicle that is controlled exclusively by a driver. If desired, vehicle 10 may be configured to operate in any one of these modes (e.g., autonomous in a first mode, semi-autonomous in a second mode, and non-autonomous in a third mode).

As shown in FIG. 1, vehicle 10 may include a body such as body 12. The example of FIG. 1 in which vehicle 10 has a sedan-style body is merely illustrative. If desired, vehicle 10 may have a sport utility vehicle body, a sports car body, a hatchback body, a station wagon body, a van or minivan body, a limousine body, a bus body, or other suitable body style. Body 12 forms at least some of the exterior surfaces of vehicle 10 and encloses an interior space in which passengers sit while in vehicle 10.

Body 12 may have body panels and other structures that are mounted on a chassis. The chassis may form the internal framework of vehicle 10 and may support body 12 and other components of vehicle 10 (e.g., engine, transmission, drive shaft, suspension, etc.). Interior components in vehicle 10 such as seating for a driver and other vehicle occupants may be supported by the chassis. External components such as wheels 18 may also be mounted to the chassis. The structures that make up body 12 and the chassis on which body 12 is mounted may include metal structures, structures formed from fiber-composite materials such as carbon-fiber materials and fiberglass, plastic, and other materials.

Vehicle 10 may include doors 16. Doors 16 may provide access to the interior space enclosed by body 12. Windows 14 may be formed at the front and rear of vehicle 10 in openings in body 12 and may be formed within doors 16 or other portions of the body 12 of vehicle 10. As shown in FIG. 1, for example, windows 14 may include a front window that faces the front of vehicle, rear facing windows, and side windows such as windows mounted within doors 16 of vehicle 10. Windows 14 in vehicle 10 may be formed from glass (e.g., glass laminated with polymer layers), plastics such as polycarbonate, or other clear materials.

Doors 16 may include left and right front doors 16-1 and left and right rear doors 16-2. Front doors 16-1 may allow passengers in the front of vehicle 10 to enter and exit the front seat area of vehicle 10. Rear doors 16-2 may allow passengers to enter and exit the back seat area of vehicle 10. The example of FIG. 1 in which vehicle 10 includes four doors (two front doors 16-1 and two rear doors 16-2) is merely illustrative. If desired, vehicle 10 may include more than four doors or less than four doors. Some of these doors may be located on the left and right sides of vehicle 10 and others may be located on a rear of vehicle 10 (e.g., one or more of doors 16 may provide access to a trunk or cargo area). Arrangements in which vehicle 10 includes four doors are sometimes described herein as an example.

In conventional vehicles, doors open and close in a fixed, non-adjustable manner. The path of motion as the doors move between open and closed positions is predetermined and does not change regardless of the vehicle's surroundings. This type of fixed motion path can make conventional doors cumbersome to use. For example, a conventional hinged door may open to a position that blocks a person's path into the vehicle, causing the person to have to walk around the door to enter the vehicle. A conventional sliding door (e.g., on a minivan) provides better access to a vehicle's interior space than a hinged door, but is generally only used as a rear door because the it would collide with an angled tire if used as a front door.

To overcome the limitations of conventional doors, doors 16 of vehicle 10 may be controlled by a door positioning system that moves doors 16 freely and fluidly relative to body 12 of vehicle 10. The manner in which the door positioning system moves doors 16 between open and closed positions may be adjusted based on the surroundings of vehicle 10 and/or based on other factors. As used herein, an "open" position may refer to the position of door 16 when it provides a path of entry into the interior space of vehicle 10. A "closed" position may refer to the position of door 16 when it blocks a path of entry into the interior space of vehicle 10.

In addition to controlling and adjusting the manner in which doors 16 move between open and closed positions, the door positioning system may be configured to adjust the position that doors 16 open to. For example, doors 16 may be oriented parallel to the side of the vehicle in one open position and may be oriented at an angle relative to the side of the vehicle in another open position.

Figure 2:
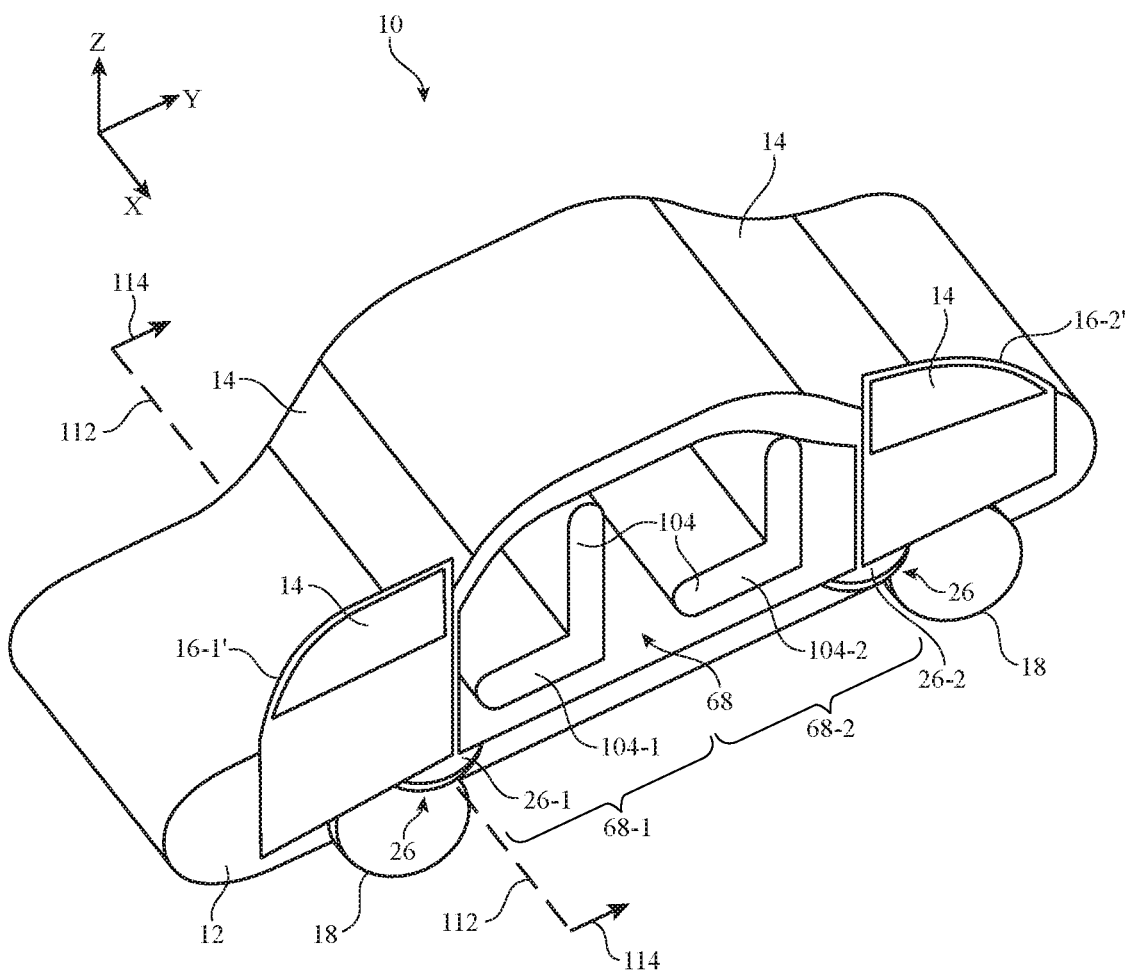
FIG. 2 is a perspective view of an illustrative vehicle with adaptively positioned doors in an open position in accordance with an embodiment.

Providing doors 16 with adjustable and adaptive motion paths can facilitate passengers' entry into and exit from vehicle 10. For example, the door positioning system may open doors 16 in such a way as to provide a large, unobstructed open area through which passengers may enter or exit vehicle 10. The door positioning system may, for example, move front doors 16-1 and rear doors 16-2 into respective open positions 16-1' and 16-2' by moving front doors 16-1 towards the front of vehicle 10 in direction 100 and rear doors 16-2 towards the back of vehicle 10 in direction 102. As shown in FIG. 2, this creates a large open area 68 through which passengers can enter and exit vehicle 10. Additionally, doors 16 may be opened to a position that is relatively close to the side of vehicle 10, thereby allowing passengers to approach or walk away from vehicle 10 in any suitable direction without being obstructed by doors 16.

Opening 68 may have a first portion 68-1 in which front door 16-1 is located when closed and a second portion 68-2 in which rear door 16-2 is located when closed. When front door 16-1 is in open position 16-1', passengers on front seat 104F may enter and exit vehicle 10 through portion 68-1 of opening 68. When rear door 16-2 is in open position 16-2', passengers on rear seat 104R may enter and exit vehicle 10 through portion 68-2 of opening 68.

In the example of FIG. 2, front portion 68-1 of opening 68 and rear portion 68-2 of opening 68 are not separated by a column or pillar. This provides a completely unobstructed opening 68 through which passengers can enter and exit vehicle 10. The absence of a pillar in opening 68 may allow easier access to the interior of vehicle 10 and may facilitate exiting vehicle 10. The absence of a pillar may also allow a greater portion of the internal volume of vehicle 10 to be used for other purposes such as enhanced seating, gaming consoles, storage area, or increased legroom. This is, however, merely illustrative. If desired, body 12 may include one or more pillars or columns in opening 68 between front portion 68-1 and rear portion 68-2.

The door positioning system in vehicle 10 may control each door 16 using a door mechanism such as door mechanism 26 (sometimes referred to as a door open and close mechanism, door mechanism structures, door control structures, or door positioning structures). Door mechanism 26 may include door positioning structures such as one or more arms, shafts, hinges, bearings, carriages, motors, actuators, slides, and/or other structures that may be used to open, close, and precisely position an associated one of doors 16. Illustrative examples of motors that may be used in door mechanism 26 include magnetic motors, electrostatic motors, piezoelectric motors, AC motors (e.g., synchronous or asynchronous motors), DC motors, or other suitable type of motor.

Some of the structures in each door mechanism 26 may be housed within body 12 of vehicle 10, some of the structures may be housed within door 16 of vehicle 10, and some of the structures may be coupled between body 12 and door 16 of vehicle 10. If desired, all of doors 16 in vehicle 10 may have the same door mechanism 26 or doors 16 may have different door mechanisms 26. For example, door mechanism 26-1 for front door 16-1 may have a slightly different or completely different configuration than door mechanism 26-2 for rear door 16-2, or door mechanisms 26-1 and 26-2 may have the same configuration.

Door mechanism 26 may include one or more rotational axes and/or one or more linear axes. In one suitable arrangement that is sometimes described herein as an example, door mechanism 26 has a first rotational axis where mechanism 26 joins with body 12, a second rotational axis where mechanism 26 joins with door 16, and a linear axis in door 16 along which door 16 slides. This allows each door 16 to be precisely positioned relative to body 12. For example, to move from a closed position to open position 16-2', door mechanism 26 may move rear door 16-2 away from body 12 (e.g., parallel to the x-axis of FIG. 2) and may slide rear door 16-2 towards the rear of vehicle 12 (e.g., parallel to the y-axis of FIG. 2). During this opening process, door mechanism 26 may rotate door 16-2 around one of its rotational axes (e.g., a rotational axis parallel to the z-axis of FIG. 2) to achieve a desired angle between door 16-2 and the side of vehicle body 12.

If desired, door mechanism 26 may include a moveable closed chain linkage in which a given number of bars or links are connected in a loop by an equal number of joints. In one illustrative example, door mechanism 26 may include a four-bar linkage having four links joined together by four hinged joints. A first rotational axis may be aligned with one of the four hinged joints and a second rotational axis may be aligned with another one of the four hinged joints. Door mechanism 26 may rotate relative to vehicle body 12 around the first rotational axis of the four-bar linkage, while door 16 may rotate relative to door mechanism 26 around the second rotational axis of the four-bar linkage. If desired, arrangements in which moveable closed chain linkages having more or less than four links connected in a loop may also be used.

The example of FIGS. 1 and 2 in which both front doors 16-1 and rear doors 16-2 remain relatively close to the side of vehicle body 12 is merely illustrative. If desired, rear doors 16-2 may open by moving linearly along the side of vehicle body 12 and front doors 16-1 may hinge open by rotating at an angle relative to the side of vehicle body 12. In another suitable arrangement, front doors 16-1 may open by moving linearly along the side of vehicle body 12 and rear doors 16-2 may hinge open by rotating at an angle relative to the side of vehicle body 12. Arrangements in which doors 16 on one side of vehicle 10 have different door mechanisms than doors 16 on the opposing side of vehicle 10 may also be used. Arrangements in which both front doors 16-1 and rear doors 16-2 move along the side of vehicle body 12 are sometimes described herein as an illustrative example.

Doors 16 may be controlled manually and/or may be controlled automatically. For example, each door 16 may have an associated door controller that operates door mechanism 26 to open and close each door 16 in response to an input event. An input event may be when an individual presses a button on vehicle 10 or presses a button on a key associated with vehicle 10. If desired, other input events may trigger movement of doors 16. For example, a door controller may automatically open front door 16-1 when sensors in vehicle 10 detect an individual (e.g., an individual carrying a key associated with vehicle 10) approaching front door 16-1.

The door controller for each door 16 may determine a path of motion for the door and may control door mechanism 26 to move door 16 accordingly. The path of motion and position of door 16 relative to body 12 may be determined based on sensor data and/or based on user input or other input. For example, when opening front door 16-1, door mechanism 26 may position door 16-1 based on the angle of the front tires 18 to avoid collision between door 16-1 and adjacent tire 18. The amount of power used to open or close each door 16 may be determined based on the incline of vehicle 10. Other information and data that may be taken into account in determining the best path of motion for doors 16 include obstruction information (e.g., obstructions in opening 68, obstructions outside of vehicle 10, etc.), vehicle orientation information, steering angle information, information about passengers in vehicle 10 (e.g., the number of passengers in vehicle 10, the location of passengers in vehicle 10, etc.), the direction in which an individual approaches vehicle 10, etc.

If desired, door mechanism 26 may be the only support member that extends between door 16 and body 12. The use of a single attachment point between door 16 and body 12 allows door 16 to move more freely and fluidly relative to body 12 than conventional door arrangements. For example, in one implementation, doors 16 may open by first moving linearly away from body 12 and by moving linearly along the side of body 12 (e.g., towards the front or rear of vehicle 10). In another implementation, doors 16 may open by first rotating inward towards the interior of body 12 and by moving linearly along the side of body 12 towards the front or rear end of vehicle 10. Both motion paths may be fluid and smooth because doors 16 are only anchored to body 12 at one location (e.g., at the point where door mechanism 26 attaches door 16 to body 12). In the example of FIG. 2, door mechanism 26 is attached to the lower portion of body 12. If desired, door mechanism 26 may be attached higher up on body 12 (e.g., just below windows 14, adjacent to windows 14, above windows 14, etc.).

The use of a single attachment point between door 16 and body 12 is merely illustrative, however. If desired, there may be additional support members extending between door 16 and body 12. Some doors 16 may have only one attachment point to body 12 and other doors 16 may have two or more attachment points to body 12. Arrangements where door mechanism 26 is the only support member attaching door 16 to body 12 are sometimes described herein as an illustrative example.

Figure 3:
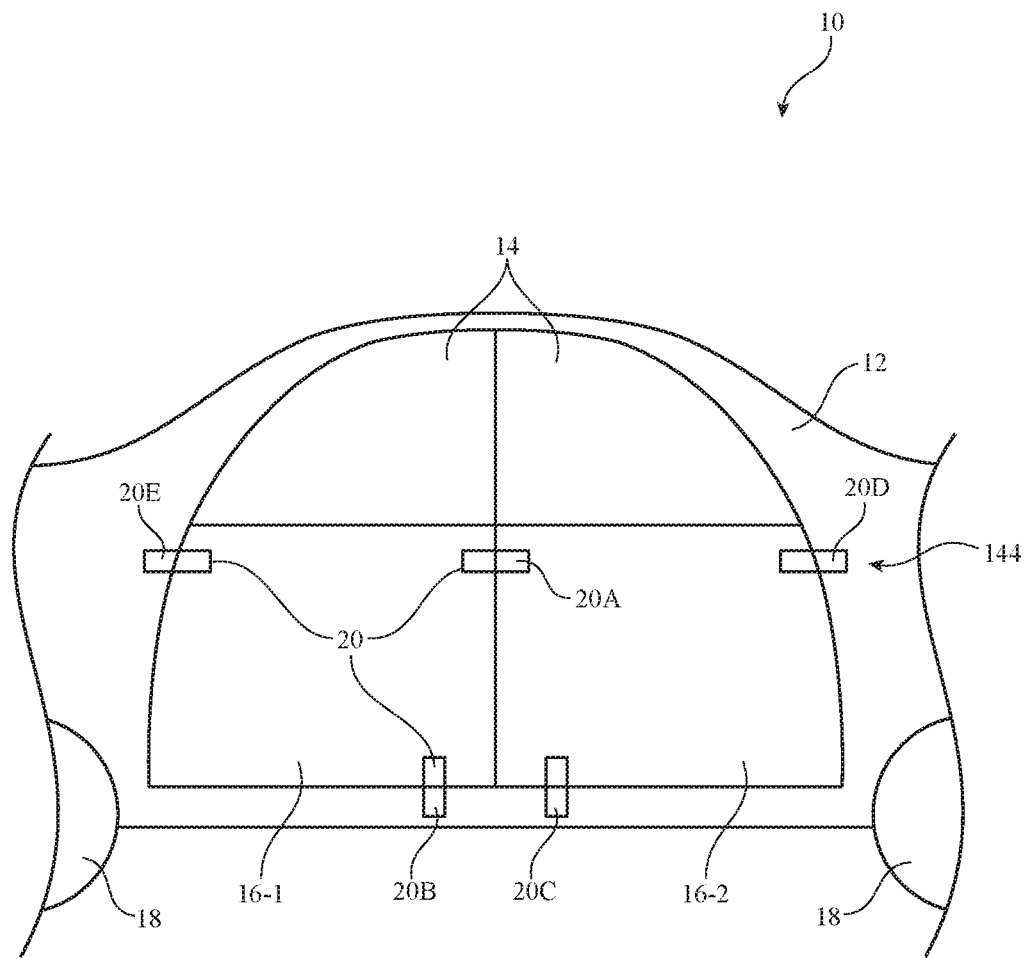
FIG. 3 is a side view of a portion of an illustrative vehicle showing how front and side doors may be secured when closed by a number of latches in accordance with an embodiment.

An illustrative latch system that may be used to lock doors 16 in place relative to body 12 is shown in FIG. 3. Latch system 144 may include a number of latch mechanisms 20 (sometimes referred to as a lock or latch). When locked, latches 20 may prevent doors 16 from opening (e.g., to prevent unauthorized access into vehicle 10, to prevent doors 16 from opening during a collision, to prevent children in the back seat of vehicle 10 from opening doors 16 from opening doors 16, etc.). Latches 20 may be operated manually (e.g., by a person actuating a switch on the interior of vehicle 10) and/or automatically (e.g., when a person in possession of the ignition key approaches vehicle 10).

Some latches 20 may lock door 16 to body 12 of vehicle 10, while other latches 20 may lock one door 16 to another door 16. For example, in arrangements where vehicle 10 does not include a pillar between front door 16-1 and rear door 16-2, one or more latches 20 may be used to secure the inner edge of front door 16-1 to the inner edge of rear door 16-2. In arrangements where vehicle 10 does include a pillar, one or more latches may be used to secure doors 16 to the pillar.

Figure 4:
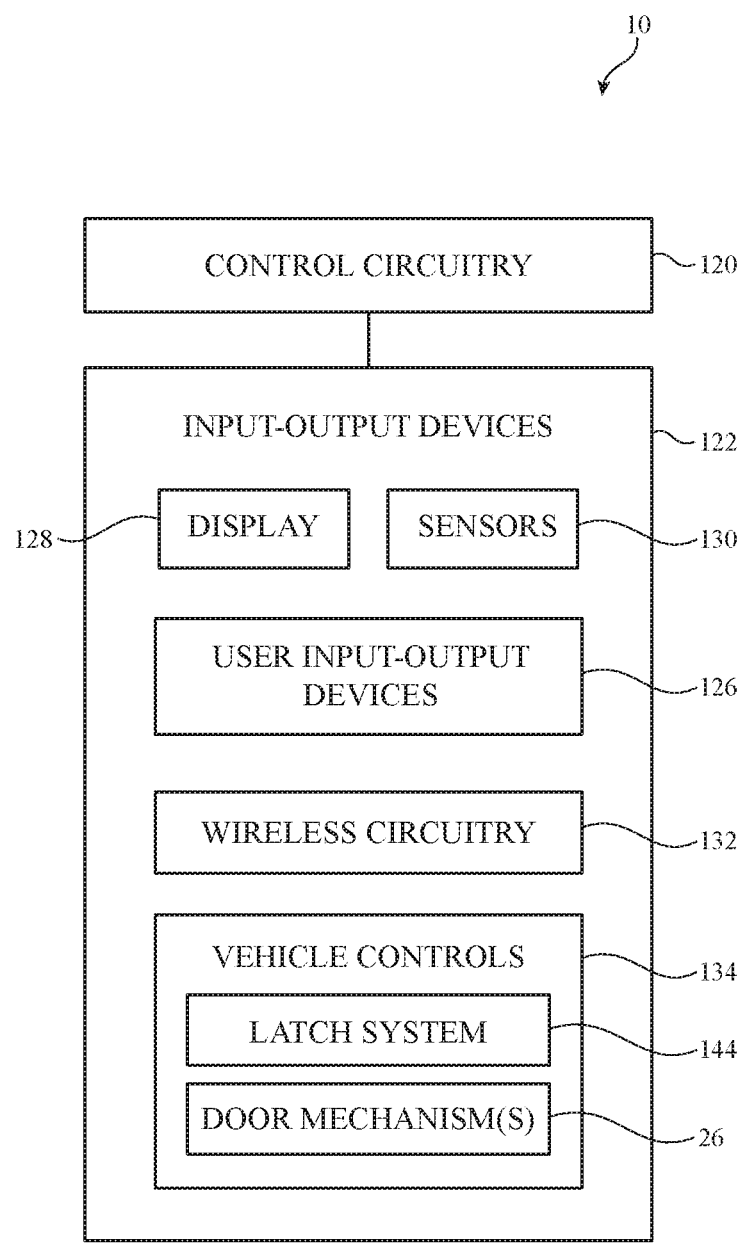
FIG. 4 is a schematic diagram of an illustrative vehicle or other system with adaptively positioned doors in accordance with an embodiment.

In the example of FIG. 3, five latches are used to secure front door 16-1 and rear door 16-2 to body 12 when doors 16-1 and 16-2 are in a closed position. Latch 20A secures front door 16-1 to rear door 16-2 when closed, latches 20C and 20D secure rear door 16-2 to body 12 when closed, and latches 20B and 20E secure front door 16-1 to body 12 when closed. The arrangement of FIG. 4 is merely illustrative, however. If desired, more or less than five latches may be used to secure a pair of front and rear doors 16 to body 12. When doors 16-1 and 16-2 are closed, latches 20 may also be closed to lock doors 16 in place within opening 68 of body 12. One or more of latches 20 may be opened when it is desired to open one of doors 16. For example, to open front door 16-1 while keeping rear door 16-2 closed, latches 20A, 20B, and 20E may be opened while latches 20C and 20D remain closed.

A schematic diagram of illustrative circuitry that may be used in operating vehicle 10 is shown in FIG. 4. As shown in FIG. 4, vehicle 10 may include control circuitry 120. Control circuitry 120 may include storage and processing circuitry for supporting the operation of vehicle 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 120 may be used to control the operation of vehicle 10. The processing circuitry may be based on one or more microprocessors, microcontrollers, digital signal processors, baseband processors, power management units, audio chips, application specific integrated circuits, electronic control units, etc. Control circuitry 120 may, for example, include a body controller that controls functions associated with body 12 and four door controllers that each control an associated one of doors 16 (e.g., each door controller may control the operation of a respective one of door mechanisms 26 to position an associated door 16).

Vehicle 10 may include input-output devices 122 that allow data to be supplied to vehicle 10 and that allow data to be provided from vehicle 10 to external systems. Input-output devices 122 may include sensors 130 for gathering information on the operating environment of vehicle 10. Sensors 130 may include light-based sensors (e.g., light-based sensors that include a light source and a light detector, light-based sensors that include one or ore lasers, light-based sensors that detect infrared light and/or visible light, etc.), wireless sensors such as radar sensors, ultrasonic sensors, proximity sensors, range-finding sensors, ambient light sensors, strain gauges, parking sensors, cruise control sensors, accelerometers, touch sensors, magnetic sensors such as electronic compass sensors, temperature sensors, rain sensors and other moisture sensors, force sensors, pressure sensors (e.g., altimeters), speedometers, odometers, tachometers, battery charge gauges, fuel gauges, circuits for determining the status of headlights and other lighting, seat belt sensors, door lock sensors, fuel door status, trunk status (open or closed), window status (up or down), and other components for making measurements on the environment surrounding vehicle 10 and the operating status of vehicle 10.

As shown in FIG. 4, input-output devices 122 may include user input-output devices 126. Devices 126 may be used to gather input from vehicle occupants and may be used in providing output to vehicle occupants. Devices 126 may include buttons, joysticks, steering wheels, shift levels and/or buttons, foot-actuated controllers (e.g., a throttle pedal, a brake pedal, a clutch pedal, etc.), touch pads, keypads, keyboards, motion sensors, microphones, cameras (digital image sensors), and other devices for gathering user input. Output devices in devices 126 may also include circuitry for generating audio output such as speakers, tone generators, and vibrators and circuitry for generating visible output.

Input-output devices 122 may include one or more displays for displaying visual information for a viewer (e.g., a driver or other vehicle occupant). For example, input-output devices 122 may include display 128. Display 128 may, if desired, be a head-up display that includes a projector (e.g., a projector based on a micromirror array), liquid crystal display, organic light-emitting diode display, or other display unit for generating images for a viewer and an optical system for directing the images towards the viewer. The optical system may include a lens to project images from the display onto front window 14-1 so that the viewer (e.g., the driver of the vehicle) can view both head-up display content reflected from the front window and real-life objects that are visible through the front window.

Wireless circuitry 132 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless information may be shared with nearby vehicles, sensors and beacons embedded along a roadway, satellites, cellular telephone networks, cellular telephones, wristwatches, and other wireless devices associated with a driver and passengers in vehicle 10, etc. Wireless information that is received by circuitry 132 may include traffic information, weather information, information on the status of nearby vehicles (e.g., direction of motion, acceleration/deceleration, brake status (braking due to application of brakes by a driver or not braking), throttle status (applied or not applied), etc.), temperature information, road condition information (as measured by sensors in vehicles and/or external sensors), etc.

Vehicle controls 134 may include control circuitry, actuators, and other systems for controlling vehicle operation. Vehicle controls 134 (sometimes referred to as vehicle control circuitry 134) may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating, shifting gears, adjusting interior and exterior lights, adjusting infotainment functions, controlling satellite navigation system operation, adjusting airbags, seatbelts, and other safety devices, controlling audio output, controlling electronic windows, the opening and closing of doors and hatches, windshield wipers, defrosters, and other climate controls, and systems for controlling and adjusting other operations during the operating of vehicle 10. Vehicle controls 134 may, for example, include door latch system 144 for securing doors 16 to body 12 and door positioning system 146 for moving and positioning doors 16 relative to body 12.

Using information from sensors 130, user input and other input from devices 126, and/or information received wirelessly from remote sources via wireless circuitry 132, vehicle 10 may determine actions to take in supplying output and otherwise controlling the operation of vehicle 10. As an example, control circuitry 120 may determine how doors 16 should be moved or positioned based on information about the environment from sensors 130 and vehicle status information from vehicle controls 134. Upon determining a desired path of motion or a desired position for one of doors 16, control circuitry 120 may send corresponding control signals to the corresponding door mechanism 26 for that door 16. In response to the control signals, one or more motors in door mechanism 26 may be actuated to move door 16 along the prescribed path or to move doors 16 into the desired position.

In one illustrative example, door mechanism 26 may open door 16 by moving door 16 linearly away from body 12 and then moving door 16 linearly along the side of body 12 (e.g., while keeping door 16 substantially parallel to the side of body 12). In another illustrative example, door mechanism 26 may open door 16 by rotating door 16 inward slightly and then moving door 16 linearly along the side of body 12 (e.g., while keeping door 16 parallel with or angled relative to the side of body 12). If desired, rotational and linear movement of door 16 may occur simultaneously so that the opening and closing of door 16 occurs smoothly and fluidly.

The precise positioning of each door 16 may be achieved by adjusting the control signals that are sent to each of the motors in door mechanism 26. For example, a first control signal from control circuitry 120 may control a first rotational actuator in door mechanism 26, a second control signal may control a second rotational actuator in door mechanism 26, and a third control signal may control a linear actuator in door mechanism 26. By adjusting these control signals, control circuitry 120 can adjust the path of motion followed by door 16 during opening and closing, the location and angle of door 16 relative to body 12 when open, the speed, smoothness, and fluidity of movement of door 16 during opening and closing, etc. This allows doors 16 to be opened and closed in a manner that adapts to the environment, the surroundings, the number and position of passengers, the type of cargo being loaded into or unloaded from vehicle 10, etc. Additionally, opening doors 16 by moving front door 16-1 and rear door 16-2 away from one another while keeping doors 16-1 and 16-2 relatively close to body 12 provides a large, unobstructed open space through which passengers can easily enter and exit vehicle 10.

FIGS. 5A-5D show top views of vehicle 10 to illustrate how front and rear doors 16 can transition from a closed position to an open position. In this example, both front door 16-1 and rear door 16-2 are opened. However, it should be understood that the movements of each door described in connection with FIGS. 5A-5D may also apply when only one of doors 16-1 and 16-2 is opened and the other remains closed.

Figure 5A:
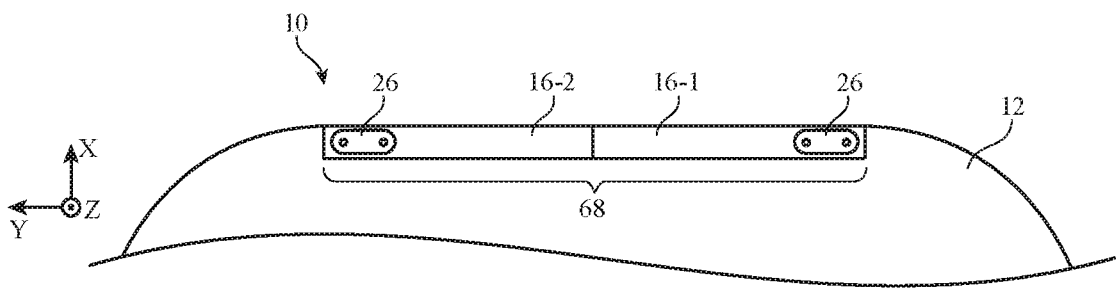
FIGS. 5A-5D are top views of a portion of an illustrative vehicle showing how doors on the vehicle may slide open in accordance with an embodiment.

In the closed position of FIG. 5A, both front door 16-1 and rear door 16-2 are located in opening 68 and latches 20 (FIG. 3) are closed. When it is desired to open doors 16-1 and 16-2, latches 20 may be opened.

Figure 5B:
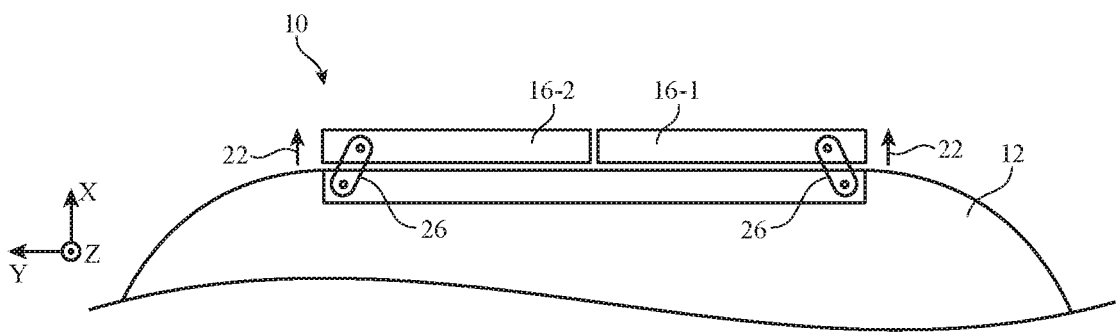

After opening latches 20, control circuitry 120 may activate door mechanisms 26 to move doors 16-2 and 16-1 away from body 12 in direction 22 to the position of FIG. 5B. In the position of FIG. 5B, doors 16-1 and 16-2 may have moved far enough in direction 22 to be able to slide along side body 12 without colliding with body 12.

Figure 5C:
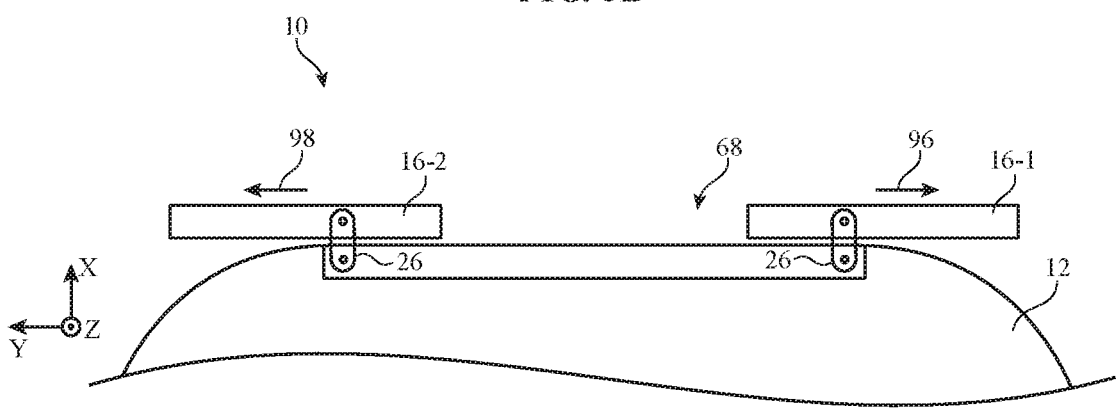

After moving doors 16 in direction 22 and obtaining sufficient clearance to slide along side body 12, door mechanism 26 may move doors 16-1 and 16-2 in opposite directions to expose opening 68 to the exterior of vehicle 10, as shown in FIG. 5C. For example, front door 16-1 may slide in direction 96 and rear door 16-2 may slide in opposite direction 98. If desired, door mechanisms 26 may move doors 16-1 and 16-2 in respective directions 96 and 98 only after moving doors 16-1 and 16-2 in direction 22 or doors 16-1 and 16-2 may be moved in direction 22 while also sliding in directions 96 and 98.

Figure 5D:
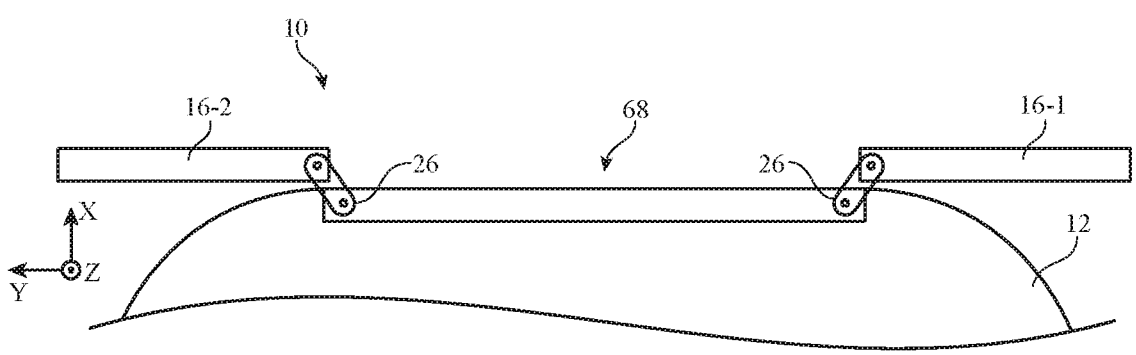

Door mechanisms 26 may slide doors 16-1 and 16-2 open until reaching a desired "final" open position as shown in FIG. 5D. In the open position of FIG. 5D, opening 68 is exposed to the exterior or vehicle 10, allowing an unobstructed path into and out of vehicle 10. To close doors 16, the movements of FIGS. 5A-5D may be followed in reverse (e.g., reverse order and reverse direction).

In the example of FIGS. 5A-5D, doors 16 remain parallel or substantially parallel to the side of body 12 during the opening process. This is, however, merely illustrative. If desired, doors 16 may be angled with respect to the side of body 12 during the door opening process.

Figure 6A:
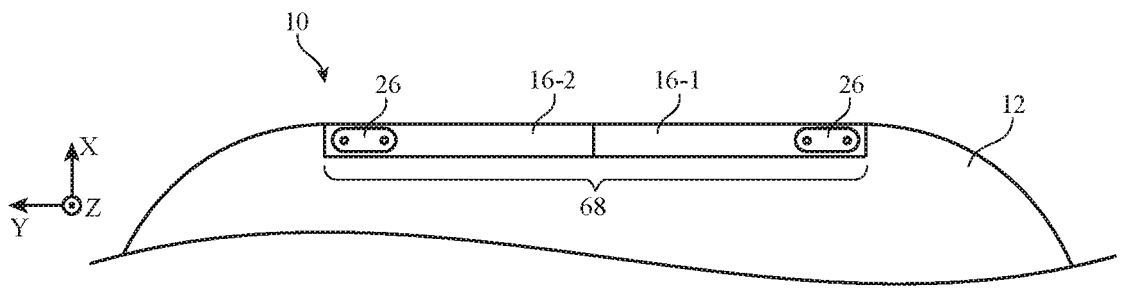
FIGS. 6A-6D are top views of a portion of an illustrative vehicle showing how doors on the vehicle may angle inwards before sliding open in accordance with an embodiment.
Figure 6B:
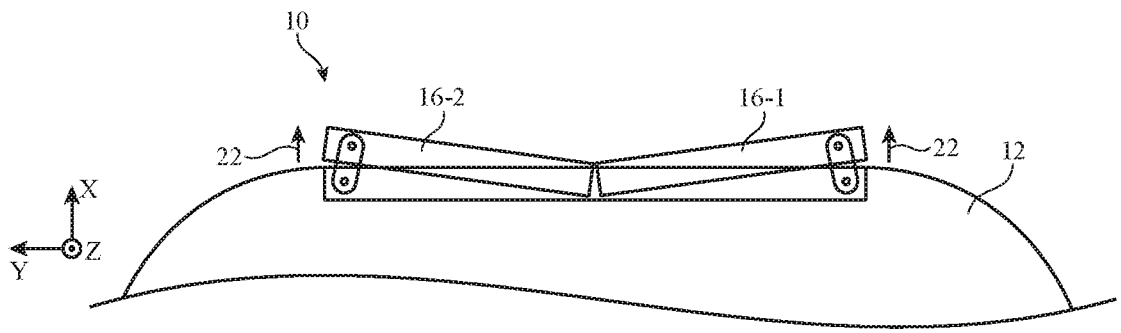
Figure 6C:
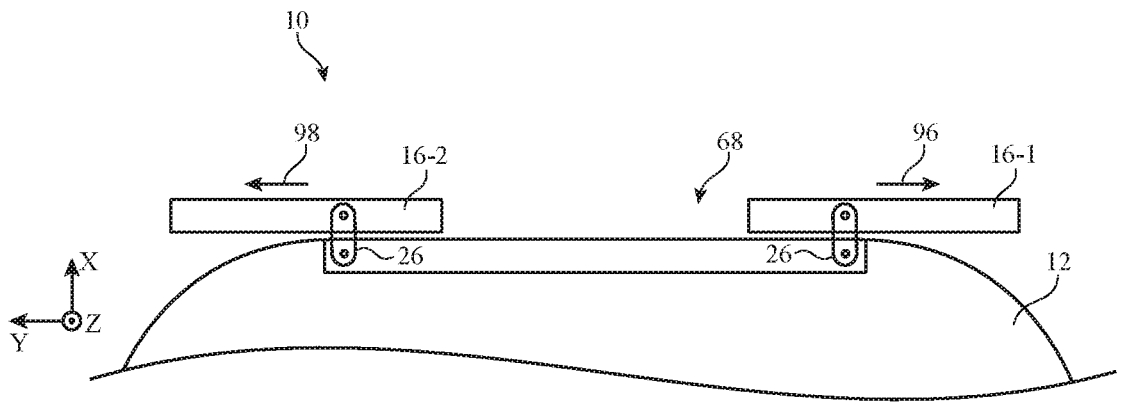

In the example of FIGS. 6A-6D, doors 16-2 and 16-1 may be may angled inward before sliding open to the position of FIG. 6C. This may be achieved by moving the outer sides of doors 16-2 and 16-1 away from body 12 in direction 22 while the inner sides of doors 16-2 and 16-1 remain within opening 68 or close to body 12.

In the closed position of FIG. 6A, both front door 16-1 and rear door 16-2 are located in opening 68 and latches 20 (FIG. 3) are closed. When it is desired to open doors 16-1 and 16-2, latches 20 may be opened.

After opening latches 20, control circuitry 120 may activate door mechanisms 26 to move the outer edges of doors 16-2 and 16-1 away from body 12 in direction 22 to the position of FIG. 6B. In the position of FIG. 6B, the inner edges of doors 16-1 and 16-2 are closer to body 12 than the outer edges of doors 16-1 and 16-2. The outer edges doors 16-1 and 16-2 may be moved far enough in direction 22 to allow doors 16 to be able to move linearly along the side of body 12 without colliding with body 12.

After moving the outer edges of doors 16 in direction 22 and obtaining sufficient clearance to begin moving linearly along the side of body 12, door mechanism 26 may move doors 16-1 and 16-2 in opposite directions to expose opening 68 to the exterior of vehicle 10, as shown in FIG. 6C. For example, front door 16-1 may begin sliding in direction 96 and rear door 16-2 may begin sliding in opposite direction 98. As doors 16-1 and 16-2 begin to move linearly in direction 96, door mechanism 26 may rotate doors 16-1 and 16-2 to move the inner edges of doors 16-1 and 16-2 away from body 12 of vehicle 10.

Figure 6D:
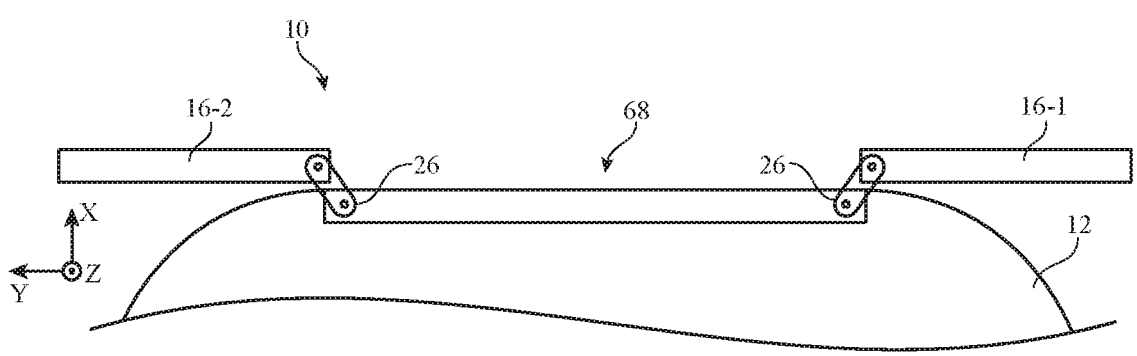

Door mechanisms 26 may move doors 16-1 and 16-2 open until reaching a desired "final" open position as shown in FIG. 6D. In the open position of FIG. 6D, opening 68 is exposed to the exterior or vehicle 10, allowing an unobstructed path into and out of vehicle 10. To close doors 16, the movements of FIGS. 6A-6D may be followed in reverse (e.g., reverse order and reverse direction).

If desired, control circuitry 120 may determine which path of motion doors 16 should follow (e.g., the motion path of FIGS. 5A-5D, the motion path of FIGS. 6A-6D, or other suitable motion path) based on information from sensors 130, other input devices, vehicle status information from vehicle controls 134, etc. For example, if sensors 130 detect an obstruction in opening 68 or in the vicinity of body 12, control circuitry 120 may adjust the motion path of doors 16 accordingly to avoid colliding with the obstruction.

Figure 7:
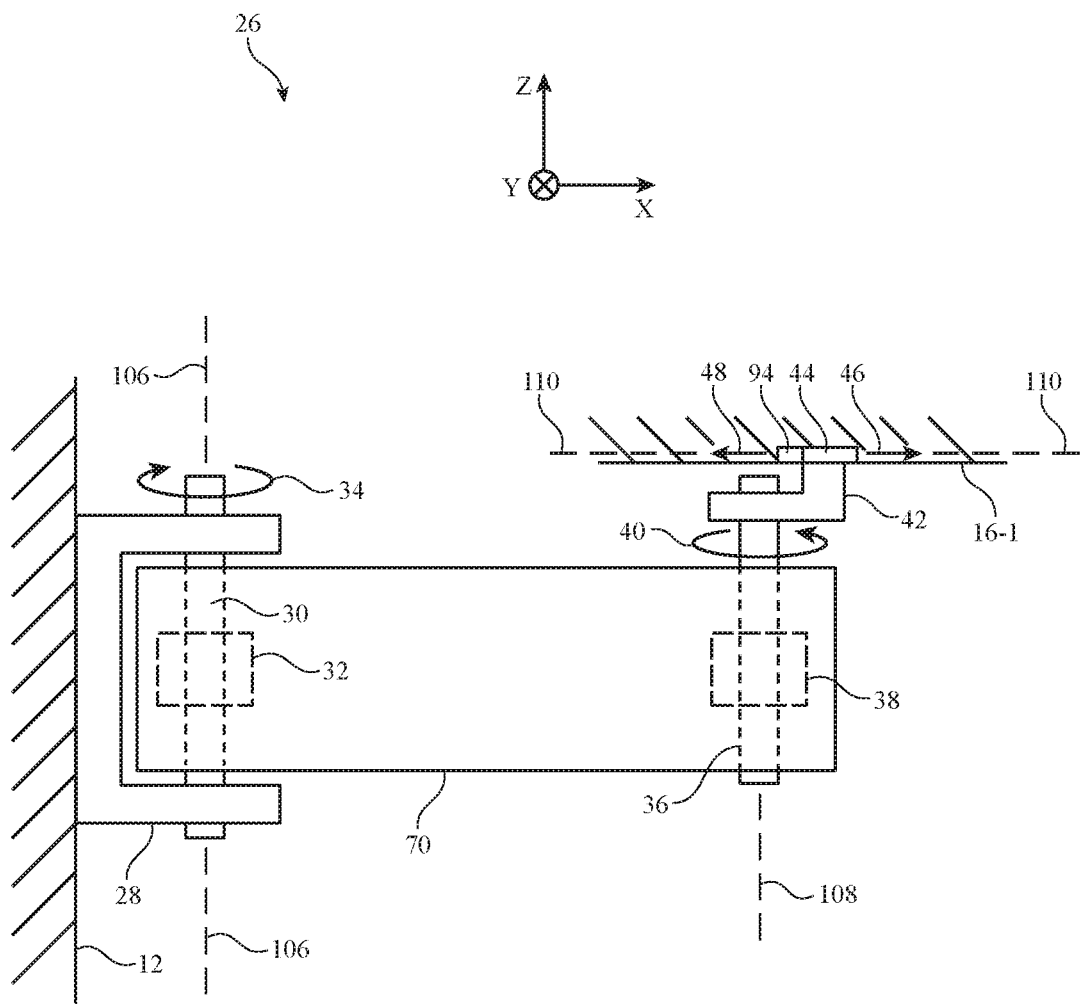
FIG. 7 is a cross-sectional side view of illustrative components in a door mechanism in accordance with an embodiment.

FIG. 7 shows a cross-sectional side view of a portion of vehicle 10 in the vicinity of one of door mechanisms 26. The diagram of FIG. 7 corresponds to a cross-section of vehicle 10 of FIG. 1 taken along line 112 and viewed in direction 114. As shown in FIG. 7, door mechanism 26 may extend between body 12 of vehicle 10 and door 16-1 of vehicle 10. Door mechanism 26 may have multiple components that allow for movement along multiple axes. The components of door mechanism 26 may include a main arm member such as arm member 70. Arm member 70 may have a first opening that receives first shaft member 30 and a second opening that receives second shaft member 36. First shaft member 30 may be secured to body 12 using one or more support structures such as support structure 28. Second shaft member 36 may be secured to slide member 44 in door 16-1 using one or more support structures such as support member 42.

A first actuator such as rotary actuator 32 may control movement of first shaft member 30, a second actuator such as rotary actuator 38 may control movement of second shaft member 36, and a third actuator such as linear actuator 94 may control movement of slide member 44 in door 16-1 (e.g., along a guide rail in door 16-1). Actuators 32, 38, and 94 may be electric actuators, hydraulic actuators, pneumatic actuators, mechanical actuators, other suitable actuators, or a combination of any two or more of these types of actuators.

In the example of FIG. 7, door mechanism 26 has three axes of motion—rotational axis 106, rotational axis 108, and linear axis 110. Rotational axes 106 and 108 may be parallel to the z-axis of FIG. 7. Linear axis 110 may be orthogonal to the z-axis of FIG. 7 but may otherwise be free to move within the x-y plane of FIG. 7. When it is desired to open door 16-1, rotary motor 32 is actuated to rotate shaft member 30 in direction 34 about its longitudinal axis 106, thereby causing arm member 70 to also rotate in direction 34 about axis 106. Rotary motor 38 is actuated to rotate shaft member 36 in direction 40 about its longitudinal axis 108, thereby causing support member 42 and door 16-1 to also rotate in direction 40 about axis 108. When linear slide motor 94 is actuated, slide member 44 can slide in direction 48 or direction 46 along axis 110. When it is desired to close door 16-1, rotation about axes 106 and 108 may be reversed. Movement along axis 110 may be in either direction 48 or direction 46.

The components and movements of FIG. 7 are merely illustrative. Door mechanism 26 may include a fewer or greater number of components than that shown in FIG. 7. For example, door mechanism 26 may include one or more arms, shafts, hinges, bearings, carriages, motors, actuators, slides, belts, pulleys, chains, guide rails, clamps, wheels, support beams, and/or other structures that may be used to open, close, and precisely position an associated door 16. In one suitable arrangement, door mechanism 26 may include a four-bar linkage. Some of the structures in each door mechanism 26 may be housed within body 12 of vehicle 10, some of the structures may be housed within door 16 of vehicle 10, and some of the structures may be coupled between body 12 and door 16 of vehicle 10.

Figure 8A:
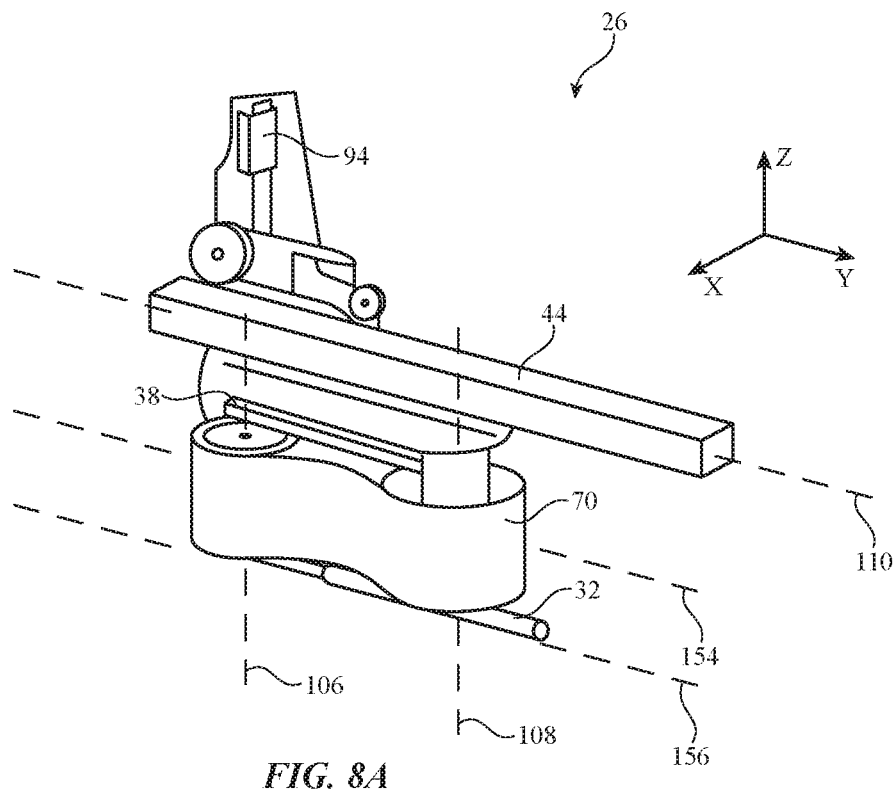
FIGS. 8A and 8B show perspective views of an illustrative door mechanism of the type shown in FIG. 7 in closed and open positions, respectively, in accordance with an embodiment.
Figure 8B:
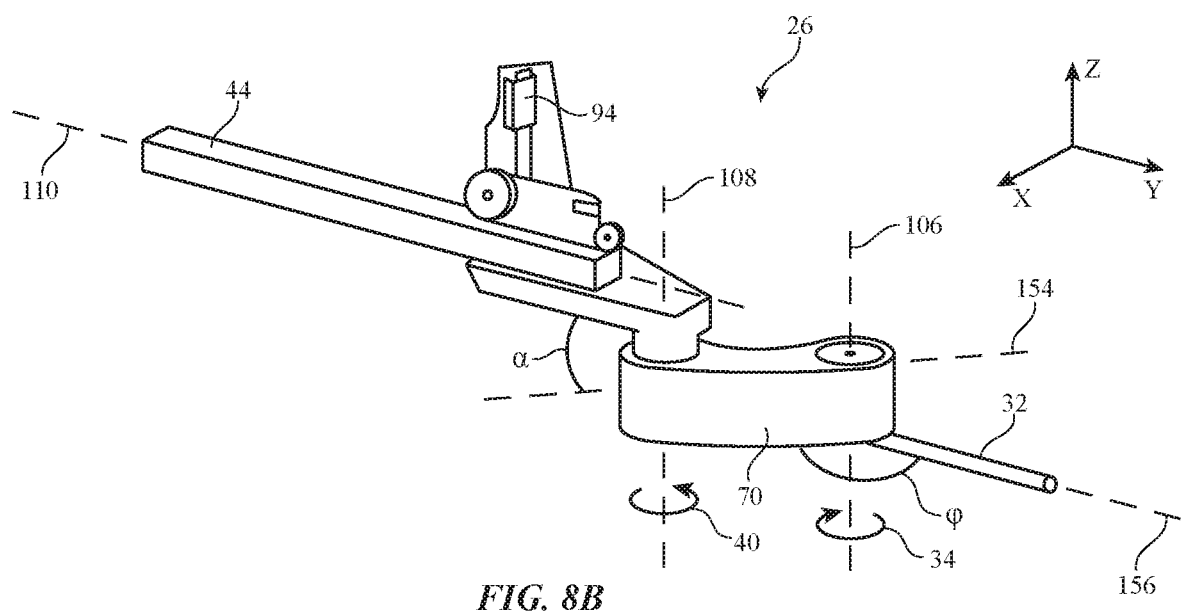

FIGS. 8A and 8B show perspective views of door mechanism 26 of FIG. 7 in closed and open states, respectively. In the example of FIGS. 8A and 8B, motor 32 and motor 38 are located on opposing sides of arm 70. Motor 32 may be housed within body 12 of vehicle 10 and motor 38 may be housed within door 16 along with motor 94. When door mechanism 26 is mounted to vehicle 10, slide member 44 may be housed within door 16 and actuator 32 may be housed within body 12. Axis 110 remains fixed relative to the plane of door 16 and longitudinal axis 156 remains fixed relative to the side of body 12.

As shown in FIG. 8A, the components of door mechanism 26 are aligned and overlapping when door mechanism 26 is in a closed state (i.e., when door 16 is closed). Longitudinal axis 156 of motor 32, longitudinal axis 154 of arm 70, and longitudinal axis 110 of linear slide member 44 are substantially parallel in the closed state.

To move into the open state of FIG. 8B, motor 32 is actuated to rotate arm 70 about rotational axis 106 in direction 34 and motor 38 is actuated to rotate member 44 (and thus door 16) about rotational axis 108 in direction 40. As arm 70 rotates about axis 106, its longitudinal axis 154 moves from being parallel to axis 156 to being oriented at an angle $\varphi$ relative to axis 156. As member 44 rotates about axis 108, its longitudinal axis 110 moves from being parallel to longitudinal axis 154 to being oriented at an angle $\alpha$ relative to axis 154.

The ability to precisely control the angle $\varphi$ between arm 70 and body 12 and the angle $\alpha$ between arm 70 and slide member 44 allows door 16 to be moved freely relative to body 12 of vehicle 10. The path of motion of door 16 may be changed by adjusting how angle $\varphi$ and angle $\alpha$ change relative to one another as door 16 moves. For example, angle $\alpha$ may be controlled such that door 16 remains parallel to the side of vehicle 10 (e.g., parallel to axis 156) even as door 16 moves between open and closed positions. Angle $\varphi$ may be controlled to maintain a desired distance between door 16 and body 12 of vehicle 10.

Figure 9A:
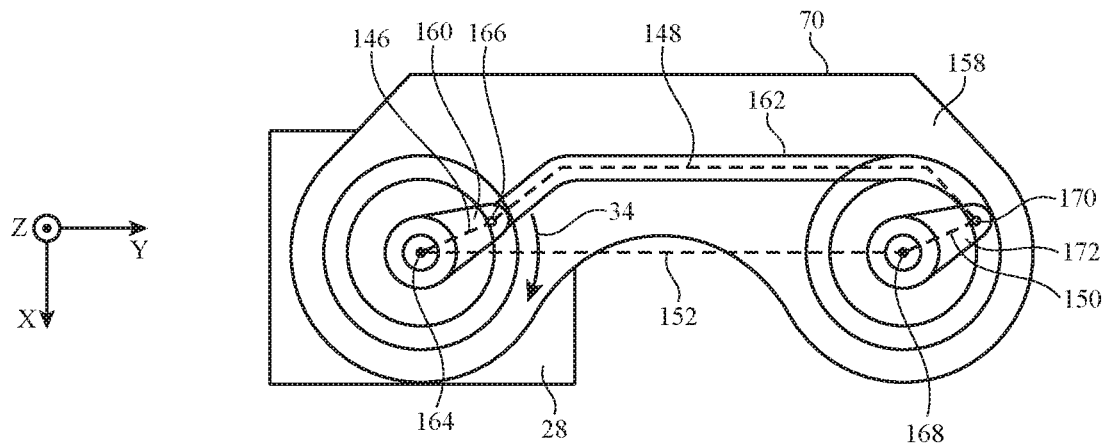
FIGS. 9A and 9B show top views of an illustrative door mechanism having a four-bar linkage in closed and open positions, respectively, in accordance with an embodiment.
Figure 9B:
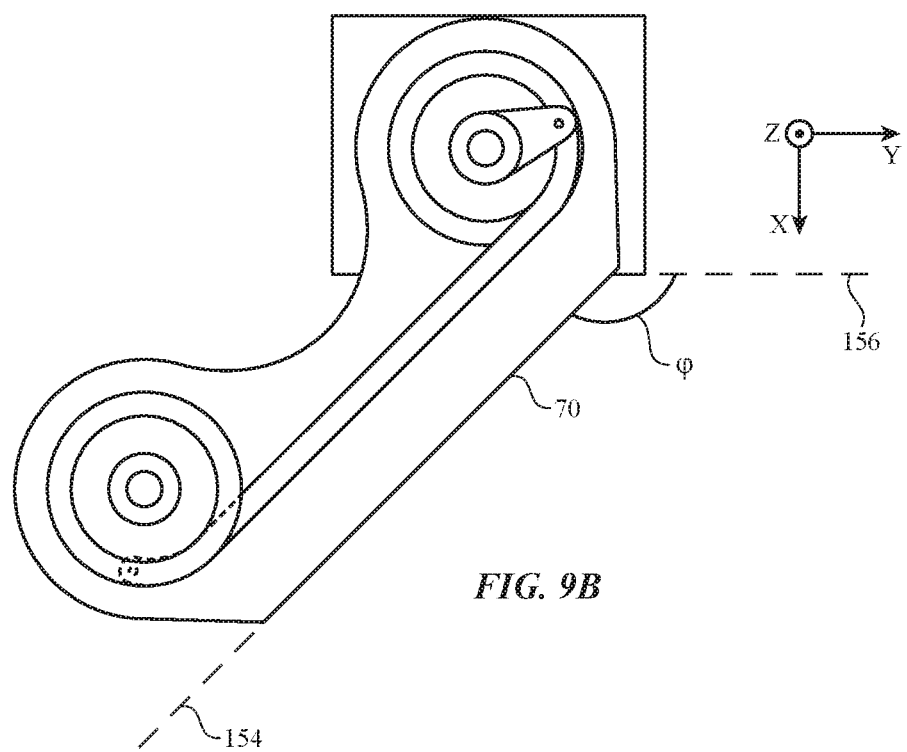

If desired, door mechanism 26 may include a four-bar linkage for achieving smooth motion of door 16. FIGS. 9A and 9B show top views of an illustrative door mechanism with a four-bar linkage in closed and open states, respectively. The four-bar linkage may be formed in arm member 70. Arm member 70 may be mounted to body 12 of vehicle 10 using support member 28. Support member 28 may be fixed relative to body 12, and arm member may be configured to rotate relative to support member 12.

The four-bar linkage may include a first link 146 formed by member 160, a second link 148 formed by member 162, a third link 150 formed by member 172, and a fourth link formed by housing member 158. Joint 164 may connect link 152 with link 146, joint 166 may connect link 146 with link 148, joint 170 may connect link 148 with link 150, and joint 168 may connect link 150 with link 152. Joints 164, 166, 170, and 168 may be hinged joints. Link 146 may be a ground link that remains stationary relative to support structure 28, while the remaining links may be free to move relative to support structure 28. Rotational axis 106 of FIG. 7 may be aligned with joint 166 and may extend parallel to the z-axis of FIG. 9A. Rotational axis 108 of FIG. 7 may be aligned with joint 168 and may extend parallel to the z-axis of FIG. 9A. When motor 32 is actuated to move door mechanism 26 into the open position of FIG. 9B, link 148 rotates in direction 34 about joint 166. This results in movement of links 150 and 152 that rotates arm member 70 outward such that arm 70 is oriented at an angle $\varphi$ relative to axis 156 (i.e., relative to the side of vehicle 10).

FIGS. 10A and 10B show top views of a portion of vehicle 10 when doors 16 are in closed and open states, respectively. In the closed position of FIG. 10A, longitudinal axis 154 of arm 70 and longitudinal axis 110 of member 44 are parallel to the side of vehicle 10 (i.e., parallel to axis 156). In the open position of FIG. 10B, arm 70 is rotated at angle $\varphi$ relative to the side of vehicle 10 (axis 156) and sliding member 44 is rotated at angle $\alpha$ relative to arm 70 (axis 154).

The control of angles $\varphi$ and $\alpha$ relative to one another allows for precise control of the angle of door 16 relative to body 12 of vehicle 10 and the distance between door 16 and body 12 of vehicle 10. In some situations, it may be desirable to keep door 16 as close as possible to body 12 during the opening and/or closing of door 16. In other situations, it may be desirable to angle door 16 slightly relative to body 12 of vehicle 10 to avoid collision with an object such as an angled tire.

Figure 11A:
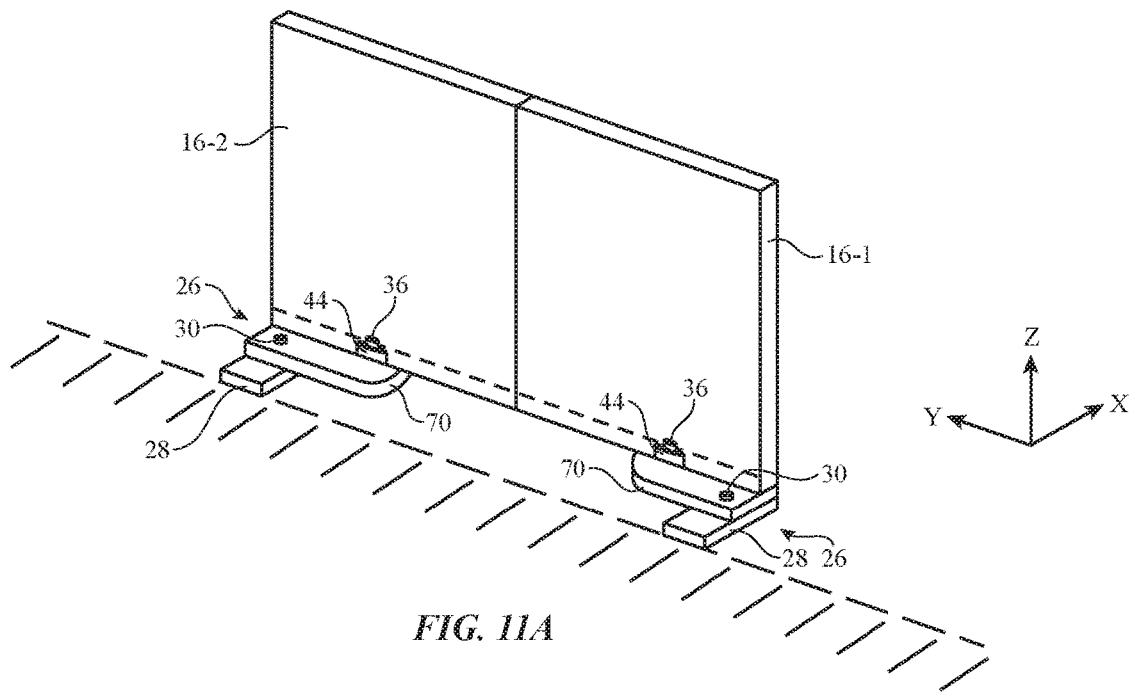
FIGS. 11A and 11B show perspective views of adaptively positioned doors in closed and open positions, respectively, in accordance with an embodiment.
Figure 11B:
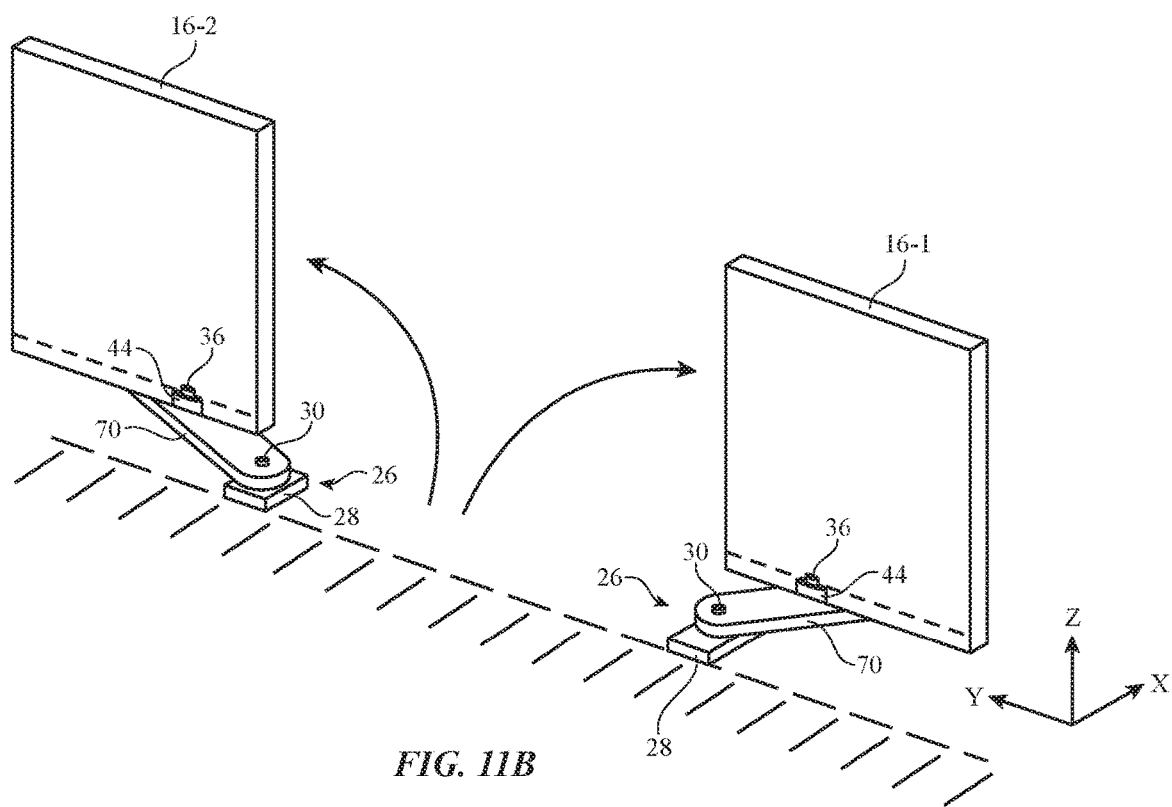

FIGS. 11A and 11B show perspective views of doors 16-1 and 16-2 in closed and open states, respectively, to illustrate how a door mechanism of the type shown in FIG. 7 may operate. As shown in the closed position of FIG. 11A, both arms 70 of each door mechanism 26 may be angled inwards (e.g., may be rotated inwards to face one another). Linear axis 110 of each slide member 44 is parallel to the longitudinal axis of arm member 70. In moving to the open position of FIG. 11B, arms 70 rotate away from one another as each arm 70 rotates about rotational axis 106. Door 16-1 (and thus linear axis 110 aligned with door 16-1) rotates about rotational axis 108 such that door 16-1 (and thus linear axis 110 of slide member 44) rotates relative to the longitudinal axis of arm member 70. Linear slide members 44 slide inwards within doors 16-1 and 16-2 (e.g., towards the inner edges of doors 16-1 and 16-2) as doors 16-1 and 16-2 move away from one another. In some configurations, sliding member 44 may slide back and forth in opposite directions along axis 110 during the opening operation to achieve the desired movement.

Figure 12:
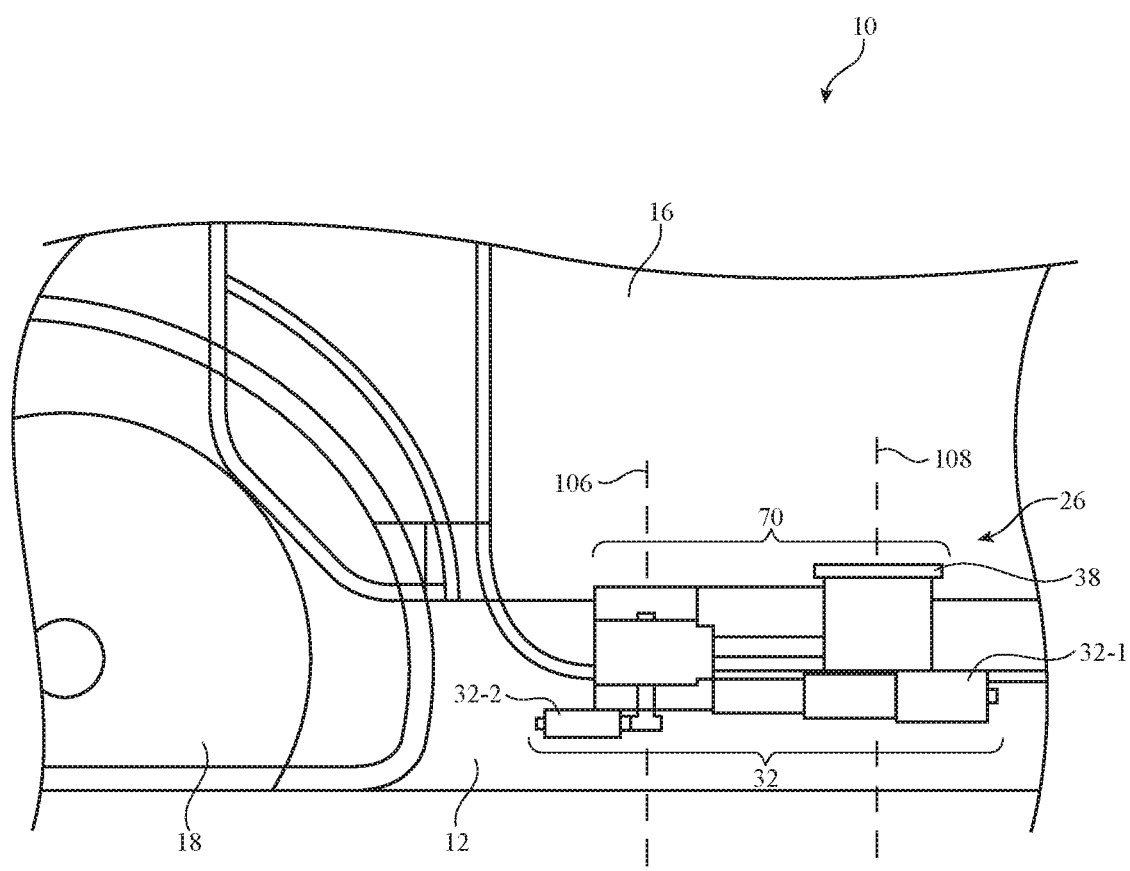
FIG. 12 is a side view of an illustrative door mechanism having components mounted within the body of a vehicle in accordance with an embodiment.

FIG. 12 is a side view of door mechanism 26 illustrating how various components of door mechanism may be mounted relative to vehicle 10. As described above, slide member 44 and linear actuator 94 (not shown in FIG. 12) may be mounted to and/or housed within door 16. Actuator 32 may be housed within body 12 of vehicle 10. In the example of FIG. 12, actuator 32 is housed within body 12 of vehicle 10 and actuator 38 is integrated with arm 70.

Actuator 32 may, if desired, be a dual drive motor having a first driver 32-1 and a second driver 32-2. Drivers 32-1 and 32-2 may be the same type of driver (e.g., drivers 32-1 and 32-2 may both be worm drives, electric linear actuators, hydraulic linear actuators, etc.) or drivers 32-1 and 32-2 may be different types of drivers (e.g., a worm drive and an electric linear actuator, a rotary hydraulic drive and an electric linear actuator, etc.).

The example of FIG. 12 is merely illustrative. If desired, actuator 32 may be integrated with arm 70, actuator 38 may be integrated with door 16, both actuator 32 and actuator 38 may be integrated with arm 70, or other suitable arrangements may be used.

Figure 13:
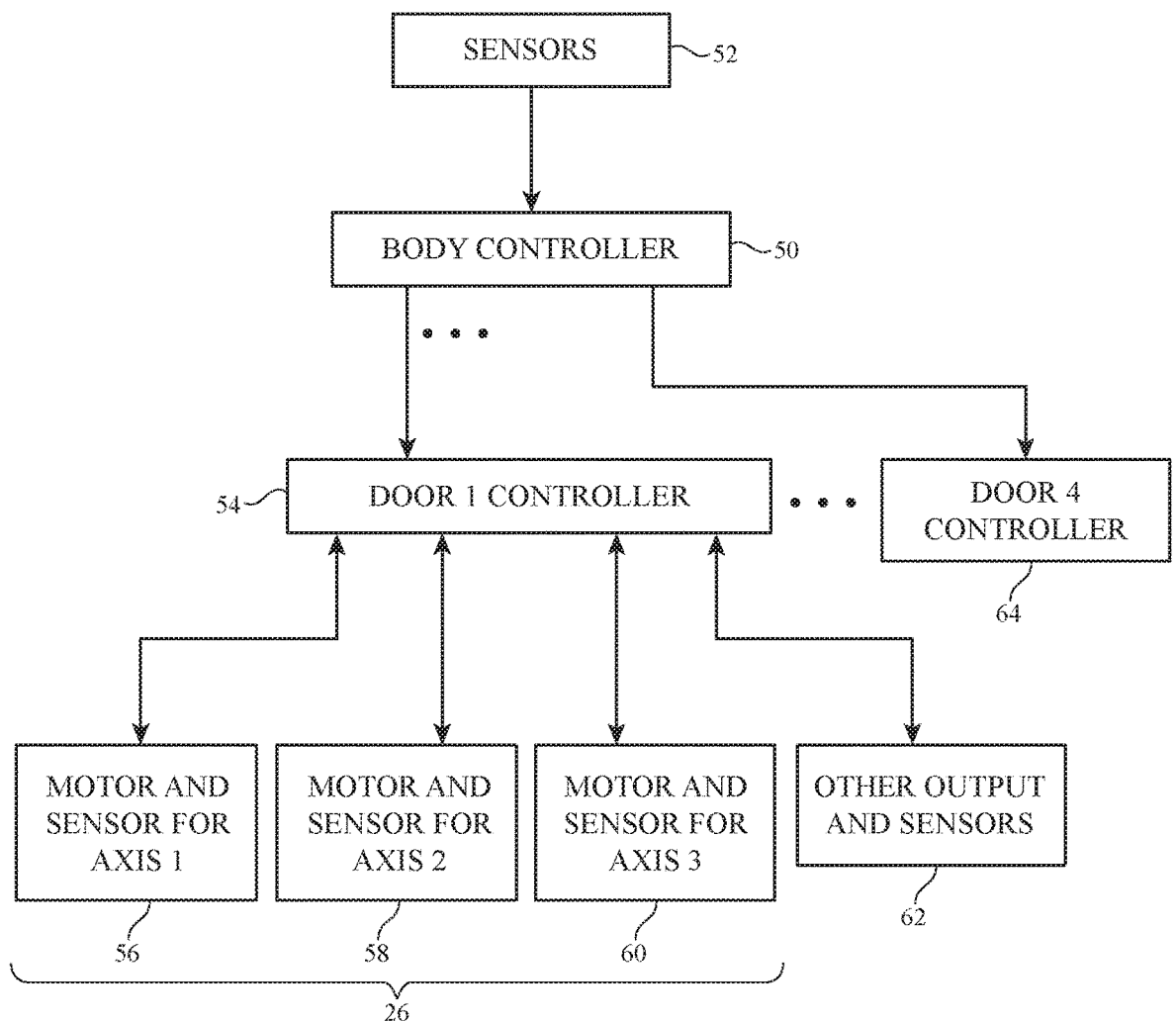
FIG. 13 is a schematic diagram of an illustrative vehicle having a door mechanism of the type shown in FIG. 7 in accordance with an embodiment.

FIG. 13 is a schematic diagram of illustrative components that may be used to control the opening and closing of doors 16 of vehicle 10. Body controller 50 may control functions associated with body 12 of vehicle 10. Body controller 50 may receive sensor data from various sensors 52 in vehicle 10 (e.g., sensors that form part of sensors 130 of FIG. 4) and may include control circuitry (e.g., control circuitry that forms part of control circuitry 120 of FIG. 4) that issues control signals to various systems in vehicle 10 (e.g., systems that form part of vehicle controls 134 of FIG. 4) based on the sensor data. For example, body controller 50 may issue control signals to door controllers that control the opening and closing of doors 16 of vehicle 10. In the example of FIG. 13, body controller 50 issues control signals to each of four door controllers such as door controller 54 for a first door (represented as door 1 in FIG. 9), a door controller for a second door, a door controller for a third door, and a door controller for a fourth door (represented as door 4 in FIG. 13).

Each door controller may control functions associated with a respective one of doors 16. For example, door controller 54 may issue control signals to and receive data from output and sensor structures 62. Structures 62 that may be controlled by door controller 54 include latches, trim lights, a window, and other structures. Structures 62 may include sensors such as window position sensors, collision sensors, window switches, latch position sensors, handle position sensors, and other devices that can provide information to door controller 54 on the status of lights, motors, and other output elements in door 1.

Each door controller may issue control signals to and receive data from an associated one of door mechanisms 26 to control the movement of an associated one of doors 16. For example, door controller 54 may issue control signals to and receive data from motor and sensor structures 56 associated with axis 1 of door mechanism 26 (e.g., rotational axis 106 of FIG. 7), motor and sensor structures 58 associated with axis 2 of door mechanism 26 (e.g., rotational axis 108 of FIG. 7), and motor and sensor structures 60 associated with axis 3 of door mechanism 26 (e.g., linear axis 110 of FIG. 7).

Because door controllers such as door controller 54 and door controller 64 control doors 16 based on control signals from body controller 50, body controller 50 and associated door controllers are sometimes referred to collectively as a door positioning system. The door positioning system may adaptively control and adjust the position and movement of doors 16 by issuing the appropriate control signals to door mechanisms 26.

Sensors associated with each axis may provide information to door controller 54 about the operating status of that axis. For example, sensors in structures 56 may provide information on the current and speed with which motor 32 is operating and the position of axis 106; sensors in structures 58 may provide information on the current and speed with which motor 38 is operating and the position of axis 108; and sensors in structures 60 may provide information on the current and speed with which motor 94 is operating and the position of axis 110. This information allows door controller 54 to confirm that door mechanism 26 is in the appropriate configuration and position after moving motors 32, 38, and 94 to open or close door 1.

In one illustrative arrangement, body controller 50 receives vehicle status information and information about the environment from sensors 52. Body controller 50 may provide the sensor data to door controller 54 when it is desired to open or close door 1, and door controller 54 may determine the best path of motion for door 1 based on the sensor data. If desired, body controller 50 may determine the best path of motion and may provide this data to door controller 54. Arrangements in which door controllers determine the best path of motion after receiving sensor data and open/close signals from body controller 50 are sometimes described herein as an example.

Information and data that door controller 54 may take into account in determining the best path of motion for door 1 include obstruction information (e.g., obstructions in opening 68, obstructions outside of vehicle 10, etc.), vehicle inclination information, vehicle orientation information, steering angle information, information about passengers in vehicle 10 (e.g., the number of passengers in vehicle 10, the location of passengers in vehicle 10, etc.), the direction in which an individual approaches vehicle 10, etc. Door controller 54 may determine what control signals to provide to structures 56, 58, and 60 based on the sensor data from sensors 52.

Figure 14:
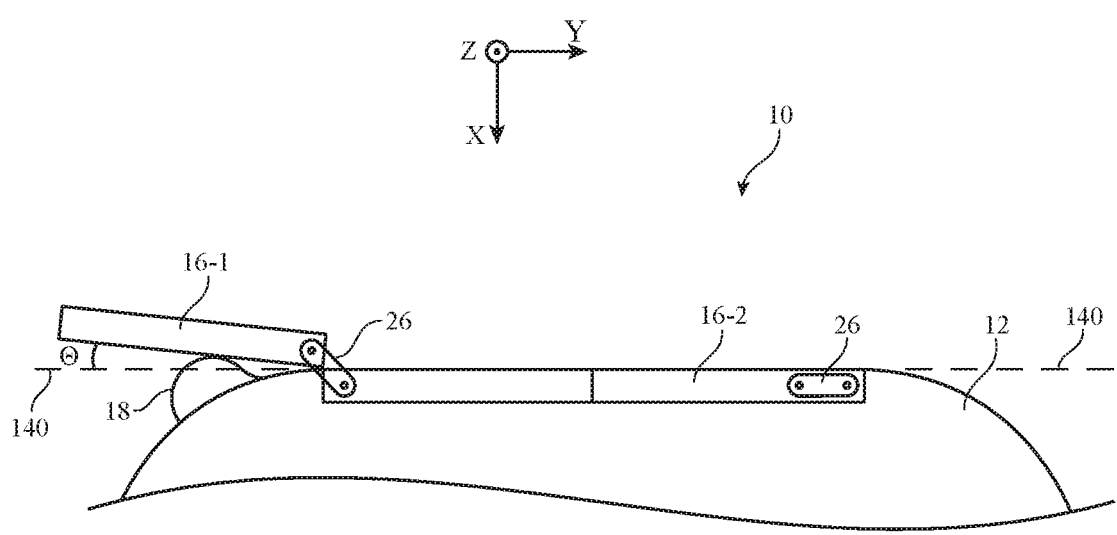
FIG. 14 is a top view of a portion of an illustrative vehicle showing how a door may be positioned according to its surroundings in accordance with an embodiment.

FIG. 14 is a top view of a portion of vehicle 10 showing how front door 16-1 may be positioned based on steering angle to avoid collision between front door 16-1 and front tire 18.

As shown in FIG. 14, the side of vehicle 10 may define a plane 140 (e.g., a plane parallel to the y-z plane of FIG. 14). Doors 16-2 and 16-1 can open parallel to plane 140 or can be angled with respect to plane 140. In the example of FIG. 14, front right tire 18 is angled outward and extends beyond plane 140. To accommodate angled tire 18, door mechanism 26 may open door 16-1 to the position of FIG. 14 in which door 16-1 is oriented at an angle θ with respect to plane 140. Body controller 50 (FIG. 13) may receive steering angle information from sensors 52 indicating the angle at which front tire 18 is oriented. After receiving a door open signal from body controller 50, door controller 54 may determine the angle θ with which door 16-1 should be oriented with respect to the side of vehicle 10 based on the steering angle information so that tire 18 does not obstruct the path of door 16-1.

Figure 15:
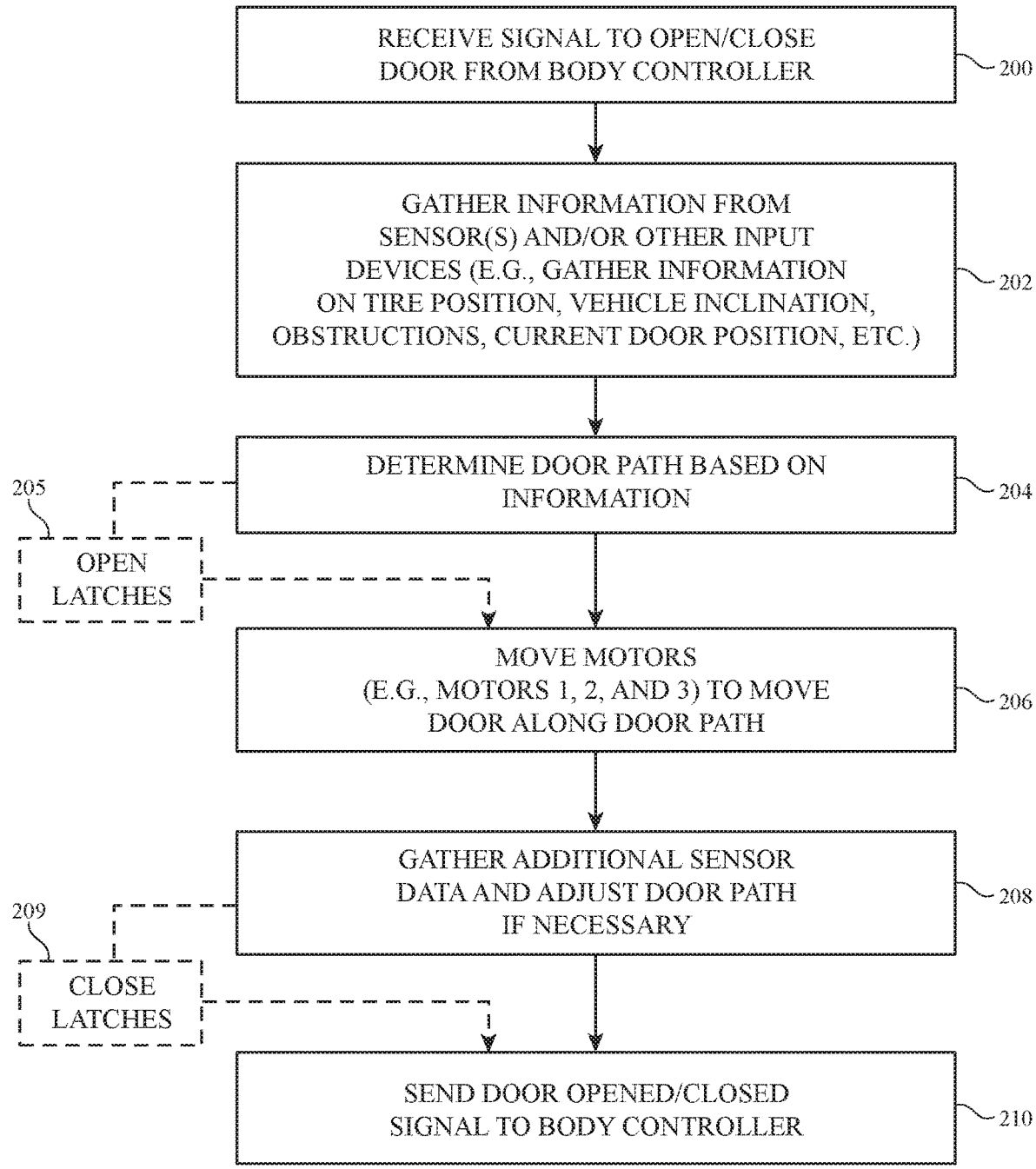
FIG. 15 is a flow chart of illustrative steps involved in opening and closing a door of a vehicle using adaptive positioning in accordance with an embodiment.

FIG. 15 is a flow chart of illustrative steps involved in opening and closing a door of the type shown in FIGS. 1 and 2 using adaptive positioning. In the description of FIG. 15, reference is made to door 1 of FIG. 13 as an example to illustrate how any one of the door controllers in vehicle 10 might open or close a door on vehicle 10.

At step 200, door controller 54 may receive a door open or door close signal from body controller 50. At step 202, door controller 54 may receive vehicle information and information about the environment around vehicle 10 from sensors 52. Information and data that door controller 54 gathers during step 202 may include obstruction information (e.g., obstructions in opening 68, obstructions outside of vehicle 10, etc.), vehicle inclination information, vehicle orientation information, steering angle information, information about passengers in vehicle 10 (e.g., the number of passengers in vehicle 10, the location of passengers in vehicle 10, etc.), the direction in which an individual approaches vehicle 10, etc.

At step 204, door controller 54 may determine the best path of motion for door 1 based on the gathered information. For example, an object may obstruct the typical path taken by door 1 and door controller 54 may determine a new path of motion to avoid collision with the object. In addition to determining the door path, step 204 may also include determining the power needed to operate each component in mechanism 26 to achieve the desired motion.

If the signal from body controller 50 was a door open signal, processing may proceed to step 205 to open latches 20 prior to moving to step 206. If the signal from body controller 50 was a door close signal, processing may proceed straight to step 206.

At step 206, door controller 54 may issue control signals to the motors of door mechanism 26 (e.g., motors 1, 2, and 3 of FIG. 13 corresponding to motors 32, 38, and 94 of FIG. 7) to move door 1 along the door path determined in step 204.

At step 208, door controller 54 may gather sensor data from sensors in door mechanism 26 (e.g., sensors in structures 56, 58, and 60 that respectively determine the position of axes 1, 2, 3) to confirm that the axes and components of door mechanism 26 are in the desired position (e.g., to ensure that door 1 has opened or closed to the desired position).

If the signal from body controller 50 was a door close signal, processing may proceed to step 209 to close latches 20 prior to moving to step 210. If the signal from body controller 50 was a door open signal, processing may proceed straight to step 210.

At step 210, door controller 54 may send a door opened signal or a door closed signal to body controller 50 depending on whether the signal from body controller 50 was a door open command or a door close command.

Various embodiments have been described illustrating an adaptive door positioning system that controls precisely how doors on a vehicle move relative to the body of the vehicle. The door positioning system may open and close the doors in a smooth, fluid, and dynamic manner that adjusts to the vehicle's surroundings. The door positioning system may determine how the doors should be moved or positioned based on sensor data and user input. By taking into account sensor data and user input, the doors on the vehicle may be appropriately positioned in order to avoid colliding with obstructions (e.g., nearby vehicles), to provide easier access to the vehicle when a passenger approaches from a given direction, to facilitate exiting the vehicle in tight parking spaces, to accommodate angled tires, to accommodate inclines, etc.

The door positioning system may include a door mechanism that controls the angle of the door relative to the side of the vehicle, the distance between the door and the side of the vehicle, and the position of the door relative to the front and rear ends of the vehicle. If desired, the front and rear doors on the side of the vehicle may be opened by moving the front door towards the front of the vehicle and the rear door towards the back of the vehicle, thereby creating a large, unobstructed, open area through which passengers may enter and exit the vehicle.

The foregoing is merely illustrative and various modifications can be made by those skilled in the art without departing from the scope and spirit of the described embodiments. The foregoing embodiments may be implemented individually or in any combination.

What is claimed is:

1. A vehicle, comprising:
a body having an opening;
a door that moves into and out of the opening;
first and second independently controlled actuators, wherein the first independently controlled actuator rotates the door about a first axis and the second independently controlled actuator rotates the door about a second axis that is parallel to the first axis;
a sensor that gathers sensor data, wherein the sensor data comprises steering angle information associated with a tire position; and
a door controller that adjusts a direction with which the door moves away from the opening based on the sensor data.

2. The vehicle defined in claim 1 wherein the door controller adjusts the direction with which the door moves away from the opening to accommodate the tire position.

3. The vehicle defined in claim 1 wherein the sensor data comprises vehicle orientation information.

4. The vehicle defined in claim 1 wherein the door controller sends control signals to the first and second independently controlled actuators to adjust the direction with which the door moves away from the opening.

5. The vehicle defined in claim 1 further comprising a third independently controlled actuator.

6. The vehicle defined in claim 5 wherein the third independently controlled actuator slides the door along a third axis.

7. The vehicle defined in claim 6 further comprising first, second, and third sensors that are each associated with a respective one of the first, second, and third independently controlled actuators.

8. A vehicle, comprising:
a body having an opening;
first and second doors that slide toward and away from the opening;
first, second, and third independently controlled actuators, wherein the first independently controlled actuator moves the first door about a first rotational axis, the second independently controlled actuator moves the first door about a second rotational axis, and the third independently controlled actuator moves the first door along a linear axis;
a sensor that gathers sensor data; and
a door controller that automatically opens the first door based on the sensor data and that determines a path along which to open the first door based on the sensor data.

9. The vehicle defined in claim 8 wherein the sensor detects a key approaching the first door and the door controller automatically opens the first door in response to the sensor detecting the key approaching the first door.

10. The vehicle defined in claim 8 wherein the door controller determines the path along which to open the first door by determining a direction with which the first door moves away from the opening.

11. The vehicle defined in claim 10 wherein the sensor data detects an obstruction and wherein the door controller determines the path along which to open the first door to avoid a collision between the first door and the obstruction.

12. The vehicle defined in claim 8 wherein the door controller controls the first door by sending control signals to the first, second, and third independently controlled actuators.

13. A vehicle, comprising:
a body having an opening;
a door that moves toward and away from the opening;
a sensor that gathers sensor data;
a door mechanism having at least first and second independently controlled actuators, wherein the first and second independently controlled actuators are configured to rotate the door about respective first and second vertical rotational axes; and
a door controller that sends control signals to the door mechanism based on the sensor data, wherein the control signals include first control signals for the first independently controlled actuator and second control signals for the second independently controlled actuator.

14. The vehicle defined in claim 13 wherein the sensor data comprises obstruction information.

15. The vehicle defined in claim 13 wherein the first and second vertical rotational axes are parallel.

16. The vehicle defined in claim 15 wherein the door mechanism comprises a third independently controlled actuator.

17. The vehicle defined in claim 16 wherein the third independently controlled actuator slides the door along a linear axis.

* * * * *